US010659806B2

(12) United States Patent
Alshina et al.

(10) Patent No.: US 10,659,806 B2
(45) Date of Patent: May 19, 2020

(54) VIDEO ENCODING METHOD AND APPARATUS, AND VIDEO DECODING METHOD AND APPARATUS USING INTERPOLATION FILTER ON WHICH IMAGE CHARACTERISTIC IS REFLECTED

(71) Applicant: SAMSUNG ELECTRONICS CO., LTD., Suwon-si (KR)

(72) Inventors: Elena Alshina, Suwon-si (KR); Alexander Alshin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 191 days.

(21) Appl. No.: 15/524,463

(22) PCT Filed: Nov. 4, 2015

(86) PCT No.: PCT/KR2015/011749
§ 371 (c)(1),
(2) Date: May 4, 2017

(87) PCT Pub. No.: WO2016/072722
PCT Pub. Date: May 12, 2016

(65) Prior Publication Data
US 2018/0027255 A1 Jan. 25, 2018

Related U.S. Application Data

(60) Provisional application No. 62/074,859, filed on Nov. 4, 2014.

(51) Int. Cl.
*H04N 19/52* (2014.01)
*H04N 19/117* (2014.01)
(Continued)

(52) U.S. Cl.
CPC .......... *H04N 19/52* (2014.11); *H04N 19/117* (2014.11); *H04N 19/122* (2014.11);
(Continued)

(58) Field of Classification Search
CPC .... H04N 19/176; H04N 19/61; H04N 19/117; H04N 19/82; H04N 19/593; H04N 19/46;
(Continued)

(56) References Cited

U.S. PATENT DOCUMENTS 8,780,995 B2     7/2014   Yoshino et al.
8,897,360 B2    11/2014   Cho et al.
(Continued)

FOREIGN PATENT DOCUMENTS

JP    2011-135184 A    7/2011
JP    2011-135460 A    7/2011
(Continued)

OTHER PUBLICATIONS

International Search Report, issued by International Searching Authority in corresponding International Application No. PCT/KR2015/011749, dated Feb. 25, 2016, (PCT/ISA/210).
(Continued)

*Primary Examiner* — Farhan Mahmud
(74) *Attorney, Agent, or Firm* — Sughrue Mion, PLLC

(57) ABSTRACT

Provided are a video encoding method and apparatus to which an interpolation filter is applied according to characteristics of an image for motion compensation, and a video decoding method and apparatus corresponding thereto. The video encoding method according to various embodiments includes determining a degree of change between neighboring samples of at least one integer pixel unit adjacent to a reference sample of an integer pixel unit of a current sample and the reference sample; determining an interpolation filter among interpolation filters having different frequency pass-
(Continued)

bands and configured to produce reference samples of a sub-pixel unit to predict the current sample, based on the degree of change; determining a predicted sample value of the current sample by using a reference sample of a sub-pixel unit produced by applying the determined interpolation filter; and encoding a residual value between the predicted sample value and a sample value of the current sample.

13 Claims, 23 Drawing Sheets

(51) Int. Cl.
*H04N 19/503* (2014.01)
*H04N 19/136* (2014.01)
*H04N 19/132* (2014.01)
*H04N 19/122* (2014.01)
*H04N 19/137* (2014.01)
*H04N 19/182* (2014.01)
*H04N 19/523* (2014.01)
*H04N 19/61* (2014.01)
*H04N 19/625* (2014.01)
*H04N 19/80* (2014.01)
*H04N 19/176* (2014.01)

(52) U.S. Cl.
CPC ......... *H04N 19/132* (2014.11); *H04N 19/136* (2014.11); *H04N 19/137* (2014.11); *H04N 19/182* (2014.11); *H04N 19/503* (2014.11); *H04N 19/523* (2014.11); *H04N 19/61* (2014.11); *H04N 19/625* (2014.11); *H04N 19/80* (2014.11); *H04N 19/176* (2014.11)

(58) Field of Classification Search
CPC ...... H04N 19/523; H04N 19/80; H04N 19/70; H04N 19/86; H04N 19/182; H04N 19/159; H04N 19/11; H04N 19/44; H04N 19/59

See application file for complete search history.

(56) References Cited

U.S. PATENT DOCUMENTS

| | | |
|---|---|---|
| 9,547,886 B2 | 1/2017 | Alshina et al. |
| 2008/0089417 A1 | 4/2008 | Bao et al. |
| 2012/0105671 A1* | 5/2012 | Taniguchi ............. H04N 9/045 348/224.1 |
| 2012/0147967 A1* | 6/2012 | Panchal ............. H04N 19/117 375/240.17 |
| 2012/0294368 A1 | 11/2012 | Kondo |

FOREIGN PATENT DOCUMENTS

| | | |
|---|---|---|
| KR | 10-2010-0087600 A | 8/2010 |
| KR | 10-2011-0112176 A | 10/2011 |
| TW | 201309035 A1 | 2/2013 |

OTHER PUBLICATIONS

Written Opinion, issued by International Searching Authority in corresponding International Application No. PCT/KR2015/011749, dated Feb. 25, 2016, (PCT/ISA/237).

* cited by examiner

CODING UNIT (1010)

PREDICTION UNIT (1060)

VIDEO ENCODING METHOD AND APPARATUS, AND VIDEO DECODING METHOD AND APPARATUS USING INTERPOLATION FILTER ON WHICH IMAGE CHARACTERISTIC IS REFLECTED

TECHNICAL FIELD

The present disclosure relates to a method of interpolating a reference sample for inter prediction.

BACKGROUND ART

As hardware for reproducing and storing high resolution or high quality video content is being developed and supplied, a need for a video codec for effectively encoding or decoding the high resolution or high quality video content is increasing. In a conventional video codec, a video is encoded using a limited encoding method based on a macroblock having a predetermined size.

Image data of a spatial region is transformed into coefficients of a frequency region via frequency transformation. In a video codec, an image is split into blocks having a predetermined size, discrete cosine transformation (DCT) is performed on each block, and frequency coefficients are encoded in block units, for rapid calculation of frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data, which is consecutively and repeatedly generated, with small-sized data.

DETAILED DESCRIPTION OF THE INVENTION

Technical Problem

The present disclosure suggests a video encoding method and apparatus to which an interpolation filter is applied according to characteristics of an image for motion compensation, and a video decoding method and apparatus corresponding thereto.

TECHNICAL SOLUTION

According to various embodiments of the present disclosure, a video encoding method includes determining a degree of change between neighboring samples of at least one integer pixel unit adjacent to a reference sample of an integer pixel unit of a current sample and the reference sample; determining an interpolation filter among interpolation filters for producing reference samples of a sub-pixel unit to predict the current sample, based on the degree of change; determining a predicted sample value of the current sample by using a reference sample of a sub-pixel unit produced by applying the determined interpolation filter to the reference sample and the neighboring samples; and encoding a residual value between the predicted sample value and a sample value of the current sample. The interpolation filters have different frequency passbands.

According to various embodiments of the present disclosure, a video decoding method includes determining a degree of change between neighboring samples of at least one integer pixel unit adjacent to a reference sample of an integer pixel unit of a current sample and the reference sample; determining an interpolation filter among interpolation filters for producing reference samples of a sub-pixel unit to predict the current sample, based on the degree of change; determining a predicted sample value of the current sample by using a reference sample of a sub-pixel unit produced by applying the determined interpolation filter to the reference sample and the neighboring samples; and producing a reconstructed sample value of the current sample by using a residual value between the predicted sample value and a sample value of the current sample. The interpolation filters have different frequency passbands.

According to various embodiments of the present disclosure, a video decoding apparatus includes a reference sample determiner configured to determine a degree of change between neighboring samples of at least one integer pixel unit adjacent to a reference sample of an integer pixel unit of a current sample and the reference sample, and determine an interpolation filter among interpolation filters for producing reference samples of a sub-pixel unit to predict the current sample, based on the degree of change; and a predictor configured to determine a predicted sample value of the current sample by using a reference sample of a sub-pixel unit produced by applying the determined interpolation filter to the reference sample and the neighboring samples, and produce a reconstructed sample value of the current sample by using a residual value between the predicted sample value and a sample value of the current sample. The interpolation filters have different frequency passbands.

According to various embodiments of the present disclosure, a video encoding apparatus includes a reference sample determiner configured to determine a degree of change between neighboring samples of at least one integer pixel unit adjacent to a reference sample of an integer pixel unit of a current sample and the reference sample, and determine an interpolation filter among interpolation filters for producing reference samples of a sub-pixel unit to predict the current sample, based on the degree of change; and a predictor configured to determine a predicted sample value of the current sample by using a reference sample of a sub-pixel unit produced by applying the determined interpolation filter to the reference sample and the neighboring samples, and encoding a residual value between the predicted sample value and a sample value of the current sample. The interpolation filters have different frequency passbands.

According to various embodiments of the present disclosure, a computer-readable recording medium having recorded thereon a program for implementing a video decoding method in a computer is suggested.

According to various embodiments of the present disclosure, a computer-readable recording medium having recorded thereon a program for implementing a video encoding method in a computer is suggested.

Advantageous Effect

In a video encoding method and a video encoding apparatus and a video decoding method and a video decoding apparatus according to various embodiments of the present disclosure, an interpolation filter may be selectively applied to generate a reference sample for motion compensation and thus a high-frequency component and a low-frequency component may be retained according to characteristics of the reference sample.

BEST MODE

Figure 1:
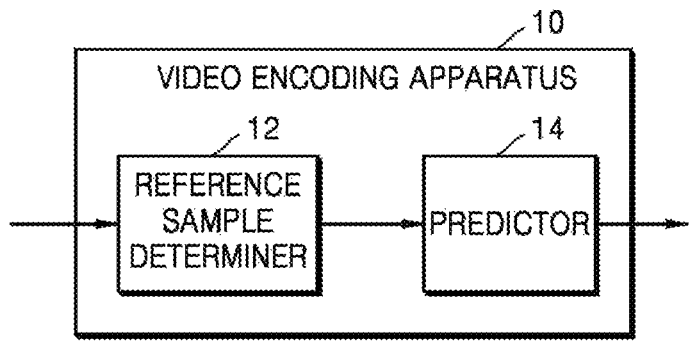
FIG. 1 illustrates a block diagram of a video encoding apparatus according to an embodiment.

According to various embodiments of the present disclosure, a video encoding method a video encoding method includes determining a degree of change between neighboring samples of at least one integer pixel unit adjacent to a reference sample of an integer pixel unit of a current sample and the reference sample; determining an interpolation filter among interpolation filters for producing reference samples of a sub-pixel unit to predict the current sample, based on the degree of change; determining a predicted sample value of the current sample by using a reference sample of a sub-pixel unit produced by applying the determined interpolation filter to the reference sample and the neighboring samples; and encoding a residual value between the predicted sample value and a sample value of the current sample. The interpolation filters have different frequency passbands.

In one embodiment, the determining of the degree of change may include determining the degree of change by using alternating-current (AC) components between the reference sample and neighboring samples of the integer pixel unit.

In one embodiment, the determining of the interpolation filter based on the degree of change may include selecting an all-pass interpolation filter for passing all frequency bands when the degree of change is large, and selecting a low-pass interpolation filter for passing low-frequency bands when the degree of change is small.

In one embodiment, the determining of the degree of change may include determining the degree of change based on a ratio between high-frequency components and low-frequency components among alternating-current (AC) components between the reference sample and neighboring samples of the integer pixel unit. In one embodiment, the determining of the interpolation filter based on the degree of change may include selecting an all-pass interpolation filter for passing all frequency bands when the high-frequency components are large, and selecting a low-pass interpolation filter for passing low-frequency bands when the low-frequency components are small.

In one embodiment, the determining of the degree of change may include performing discrete cosine transformation (DCT) on the reference sample and neighboring samples of the integer pixel unit, and determining the degree of change based on a ratio between low-frequency alternating-current (AC) components and high-frequency AC components among DCT coefficients. The DCT coefficients and DCT size may be determined based on a number of taps of the interpolation filter.

In one embodiment, the reference sample of the integer pixel unit may be a sample at a position on a reference block indicated by integer components of a motion vector of a current block including the current sample, and the reference sample of the sub-pixel unit may be a sample at a position of a sub-pixel unit adjacent to the reference sample of the integer pixel unit, the position being indicated by a sub-pixel component of the motion vector of the current block.

According to various embodiments of the present disclosure, a video decoding method includes determining a degree of change between neighboring samples of at least one integer pixel unit adjacent to a reference sample of an integer pixel unit of a current sample and the reference sample; determining an interpolation filter among interpolation filters for producing reference samples of a sub-pixel unit to predict the current sample, based on the degree of change; determining a predicted sample value of the current sample by using a reference sample of a sub-pixel unit produced by applying the determined interpolation filter to the reference sample and the neighboring samples; and producing a reconstructed sample value of the current sample by using a residual value between the predicted sample value and a sample value of the current sample. The interpolation filters have different frequency passbands.

In one embodiment, the determining of the degree of change may include determining the degree of change by using alternating-current (AC) components between the reference sample and neighboring samples of the integer pixel unit.

In one embodiment, the determining of the interpolation filter based on the degree of change may include selecting an all-pass interpolation filter for passing all frequency bands when the degree of change is large, and selecting a low-pass interpolation filter for passing low-frequency bands when the degree of change is small.

In one embodiment, the determining of the degree of change may include determining the degree of change based on a ratio between high-frequency components and low-frequency components among alternating-current (AC) components between the reference sample and neighboring samples of the integer pixel unit.

In one embodiment, the determining of the interpolation filter based on the degree of change may include selecting an all-pass interpolation filter for passing all frequency bands when the high-frequency components are large, and selecting a low-pass interpolation filter for passing low-frequency bands when the low-frequency components are small.

In one embodiment, the determining of the degree of change may include performing discrete cosine transformation (DCT) on the reference sample and neighboring samples of the integer pixel unit, and determining the degree of change based on a ratio between low-frequency alternating-current (AC) components and high-frequency AC components among DCT coefficients. The DCT coefficients and DCT size may be determined based on a number of taps of the interpolation filter.

According to various embodiments of the present disclosure, a video encoding apparatus includes a reference sample determiner configured to determine a degree of change between neighboring samples of at least one integer pixel unit adjacent to a reference sample of an integer pixel unit of a current sample and the reference sample, and determine an interpolation filter among interpolation filters for producing reference samples of a sub-pixel unit to predict the current sample, based on the degree of change; and a predictor configured to determine a predicted sample value of the current sample by using a reference sample of a sub-pixel unit produced by applying the determined interpolation filter to the reference sample and the neighboring samples, and encoding a residual value between the predicted sample value and a sample value of the current sample. The interpolation filters have different frequency passbands.

According to various embodiments of the present disclosure, a video decoding apparatus includes a reference sample determiner configured to determine a degree of change between neighboring samples of at least one integer pixel unit adjacent to a reference sample of an integer pixel unit of a current sample and the reference sample, and determine an interpolation filter among interpolation filters for producing reference samples of a sub-pixel unit to predict the current sample, based on the degree of change; and a predictor configured to determine a predicted sample value of the current sample by using a reference sample of a sub-pixel unit produced by applying the determined interpolation filter to the reference sample and the neighboring samples, and produce a reconstructed sample value of the current sample by using a residual value between the predicted sample value and a sample value of the current sample. The interpolation filters have different frequency passbands.

According to various embodiments of the present disclosure, a computer-readable recording medium having recorded thereon a program for implementing a video decoding method in a computer is suggested.

According to various embodiments of the present disclosure, a computer-readable recording medium having recorded thereon a program for implementing a video encoding method in a computer is suggested.

MODE OF THE INVENTION

Advantages and features of the present disclosure and methods of achieving them will be apparent from embodiments which are to be described below, together with the accompanying drawings. However, the present disclosure is not, however, limited to these embodiments and may be embodied in many different forms. Rather, these embodiments are provided so that the present disclosure will be thorough and complete and will fully convey the concept of the disclosure to one of ordinary skill in the art. The scope of the present disclosure is defined in the claims.

The terms used herein will be briefly described and then the present disclosure will be described in greater detail below.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

As used herein, the singular forms 'a', 'an' and 'the' are intended to include the plural forms as well, unless the context clearly indicates otherwise.

Also, throughout the specification, when a part "includes" or "comprises" an element, unless there is a particular description contrary thereto, the part can further include other elements, not excluding the other elements. The term 'unit', as used herein, means, but is not limited to, a software or hardware component, such as a Field Programmable Gate Array (FPGA) or Application Specific Integrated Circuit (ASIC), which performs certain tasks. However, the "unit" is not limited to software or hardware. A "unit" may be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units"

may be combined into fewer components and "units" or may be further separated into additional components and "units".

Hereinafter, embodiments of the present disclosure will be described in detail so that one of ordinary skill in the technical field to which the present disclosure pertains may easily implement them with reference to the accompanying drawings below. For clarity, parts which are not related to explaining the present disclosure will be omitted in the drawings.

A video encoding apparatus, a video encoding method, a video decoding apparatus, and a video decoding method which selectively use an interpolation filter according to various embodiments will be described with reference to FIGS. 1 to 8 below. Furthermore, a video encoding apparatus, a video encoding method, a video decoding apparatus, and a video decoding method based on coding units having a tree structure according to various embodiments will be described with reference to FIGS. 10 to 22 below. In addition, various embodiments to which the video encoding method, the video decoding method, the video encoding method, and the video decoding method according to the embodiments of FIGS. 1 to 22 are applicable will be described with reference to FIGS. 23 to 29 below.

Hereinafter, an 'image' may indicate a still image of a video or a moving picture, i.e., the video itself.

Hereinafter, a 'sample' denotes data that is assigned to a sampling location of an image and is to be processed. For example, samples may be values of pixels or a residual value of a block of an image of a spatial region.

The term 'current block' should be understood to include a block of an image to be encoded or decoded.

The term 'neighboring block' should be understood to include at least one encoded or decoded block neighboring to a current block. For example, neighboring blocks may be located at an upper portion, an upper right portion, a left portion, an upper left portion, and a lower left portion of current block. Also, a neighboring block may be a spatially neighboring block or a temporally neighboring block. For example, a co-located block which is a spatially neighboring block may include either a block of a reference picture which is at the same position as a current block or a neighboring block adjacent to the block of the reference picture which is at the same position as the current block.

First, a video encoding apparatus, a video encoding method, and a video decoding apparatus, and a video decoding method according to various embodiments will be described with reference to FIGS. 1 to 10 below.

FIG. 1 illustrates a block diagram of a video encoding apparatus 10 according to an embodiment.

In one embodiment, the video encoding apparatus 10 includes a reference sample determiner 12 and a predictor 14.

In one embodiment, the video encoding apparatus 10 may determine a reference block included in a reference picture and most similar to a current block which is a block in an inter-prediction mode, and perform motion estimation to determine a motion vector representing the difference between positions of the current block and the reference block. In this case, for more precise motion estimation, reference samples of a sub-pixel unit between reference samples of an integer pixel unit of the reference picture may be produced, and a motion vector of a sub-pixel unit indicating a determined reference sample may be determined. The video encoding apparatus 10 may generate reference samples of a sub-pixel unit by applying an interpolation filter to the reference samples of an integer pixel unit.

In one embodiment, the video encoding apparatus 10 may determine a predicted block of a current block which is a block in the inter-prediction mode by using a reference block indicated by a motion vector. For more precise motion estimation, a reference block may be determined according to a motion vector of a sub-pixel unit. The video encoding apparatus 10 may produce reference samples of a coding unit by applying an interpolation filter to samples of an integer pixel unit to determine reference samples of a sub-pixel unit between integer pixel unit samples of the reference block.

In one embodiment, the video encoding apparatus 10 may apply an interpolation filter to a position of each of sub-pixel units so as to produce samples of the sub-pixel units from samples of an integer pixel unit. When a filter coefficient set including filter coefficients of the interpolation filter is stored in a storage unit (not shown) of the video encoding apparatus 10, a filter coefficient which is set for a position of each coding unit may be stored. For example, when an interpolation filter for producing reference samples of a sub-pixel unit of a ¼-pixel unit is needed, a filter coefficient set may be set for each of a ¼ pixel, a 2/4 pixel, and a ¾-pixel.

In one embodiment, the video encoding apparatus 10 may set a plurality of interpolation filters having different passbands with respect to sub-pixel units. For example, an all-pass interpolation filter and a low-frequency band pass interpolation filter may be set for each of a ¼ pixel, a 2/4 filter, and a ¾ pixel.

In one embodiment, the video encoding apparatus 10 may produce reference samples of a sub-pixel unit by determining one of a plurality of interpolation filters on the basis of image characteristics determined from a reference block. For example, a frequency band pass filter may be selectively determined for each of a ¼ pixel, a 2/4 pixel, and a ¾ pixel.

In one embodiment, the reference sample determiner 12 of the video encoding apparatus 10 may use a degree of change between reference samples of an integer pixel unit of a reference block to select one of a plurality of interpolation filters. In one embodiment, the reference sample determiner 12 may determine a degree of change between neighboring samples of at least one integer pixel unit adjacent to a reference sample of an integer pixel unit of a current sample and the reference sample. To predict a current sample, the reference sample determiner 12 may determine an interpolation filter among interpolation filters for producing reference samples of a sub-pixel unit on the basis of the degree of change between the reference samples of the integer pixel unit. The interpolation filters may have different-frequency passbands as described above.

In one embodiment, the predictor 14 of the video encoding apparatus 10 may determine a predicted sample value of a current sample by using reference samples of a sub-pixel unit which are produced by applying the interpolation filter determined by the reference sample determiner 12 to a reference sample and neighboring samples.

During motion estimation conducted to determine a motion vector, the video encoding apparatus 10 according to an embodiment may encode a residual value between the predicted sample value of the current block determined by the predictor 14 and a sample value of the current block.

In motion compensation performed by the video encoding apparatus 10, a reconstructed sample value of a current sample may be produced using the predicted sample value of the current sample determined by the predictor 14 and the residual value. In one embodiment, the video encoding apparatus 10 may perform deblocking filtering and in-loop filtering, such as a sample adaptive offset (SAO) process, on the reconstructed sample value of the current sample, and store the filtered reconstructed sample value in a reconstructed-picture buffer (not shown).

A video encoding method 20 performed by the video encoding apparatus 10 according to various embodiments will be described in detail with reference to FIG. 2 below.

Figure 2:
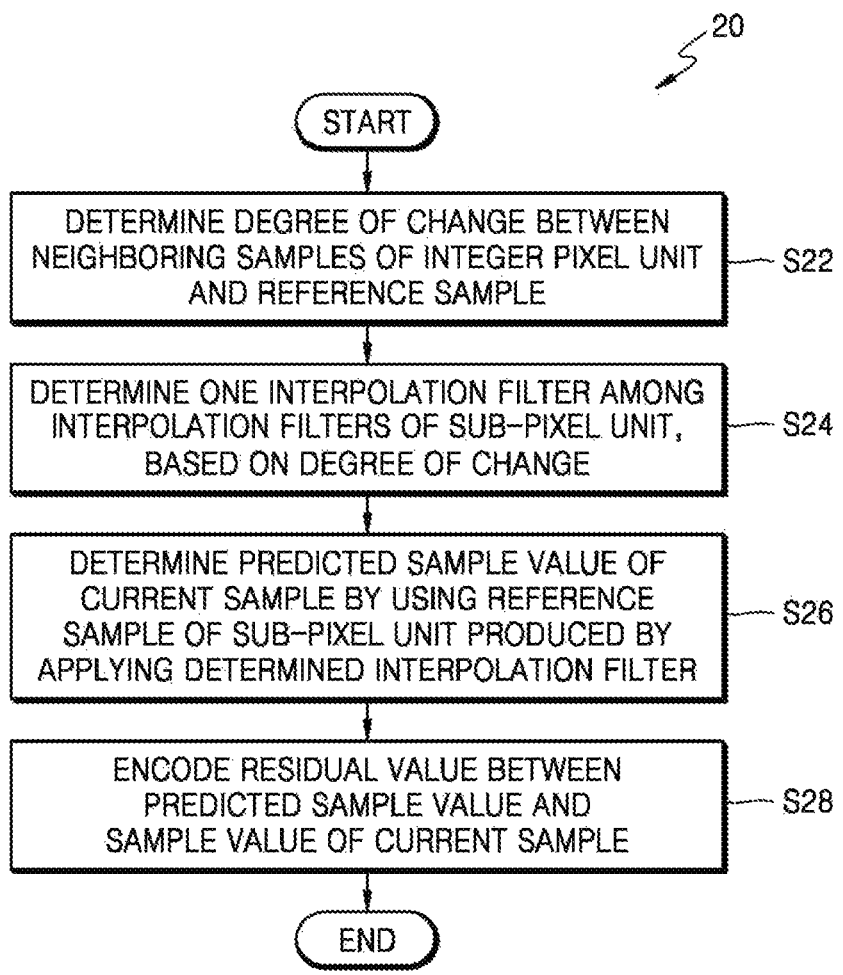
FIG. 2 illustrates a flowchart of a video encoding method according to an embodiment.

FIG. 2 illustrates a flowchart of a video encoding method 20 according to an embodiment.

In operation S22, the reference sample determiner 12 may determine a degree of change between neighboring samples of at least one integer pixel unit adjacent to a reference sample of an integer pixel unit of a current sample and the reference sample. In operation S24, in order to predict the current sample, the reference sample determiner 12 may determine one interpolation filter among interpolation filters for producing reference samples of a sub-pixel unit on the basis of the degree of change.

In one embodiment, the reference sample determiner 12 may determine a degree of change between reference samples by using an alternating-current (AC) component between a reference sample and neighboring samples of an integer pixel unit. The reference sample determiner 12 may select an all-pass interpolation filter which passes all frequency bands when the degree of change is large, and select a low-pass interpolation filter which passes low-frequency bands when the degree of change is small.

In one embodiment, the reference sample determiner 12 may determine a degree of change between reference samples on the basis of a ratio between low-frequency components and high-frequency components among AC components between the reference sample and neighboring samples of the integer pixel unit. An all-pass interpolation filter which passes all frequency bands may be selected when high-frequency components are large. A low-pass interpolation filter which passes low-frequency bands may be selected when low-frequency components are small.

In one embodiment, in order to determine a degree of change between reference samples, the reference sample determiner 12 may apply discrete cosine transformation (DCT) to a reference sample and neighboring samples of an integer pixel unit, and determine a degree of change between the reference samples on the basis of a ratio between low-frequency AC components and high-frequency AC components among DCT coefficients. In this case, the DCT coefficients and DCT size may be determined on the basis of an interpolation-filter tap number.

For example, when the interpolation-filter tap number is N, DCT with a size of N−1 may be applied to reference samples of an integer pixel unit to be used for interpolation filtering. That is, when a one-dimensional (1D) interpolation filter is used, an interpolation filter coefficient is applied to neighboring samples of integer pixel units adjacent to opposite sides of a current reference sample in a direction in which filtering is performed. When a 1D interpolation-filter tap number is N, interpolation filtering may be performed on neighboring samples of (N/2−1) consecutive integer pixel units in various directions of a current reference sample and the current reference sample. That is, a total of (2×(N/2−1)+1) reference samples, i.e., at least (N−1) reference samples, may be used in interpolation filtering when (N/2−1) samples in a first direction, (N/2−1) samples in a second direction, and the current reference sample are taken into account. Furthermore, DCT may be performed on (N−1) reference samples used in interpolation filtering.

By performing the DCT with a size of N−1, a total of (N−1) DCT coefficients may be produced. That is, a direct-current (DC) component and AC_1, AC_2, . . . , AC_(N−2) coefficients may be produced in the order of low-frequency components to high-frequency components. In one embodiment, the reference sample determiner 12 may use, as the degree of change between the reference samples, a ratio AC_1/AC_(N−2) between the AC_1 coefficient which is a lowest frequency component and the AC_(N−2) coefficient which is a highest frequency component among AC components.

As a concrete example, when an interpolation-filter tap number is '8', DCT with a size of 7 which is applicable to samples of seven integer pixel units may be performed, and a ratio AC_1/AC_6 between an AC_1 coefficient and an AC_6 coefficient among AC components produced by performing the DCT with the size of 7 may be used as the degree of change. When the degree of change AC_1/AC_6 is greater than a predetermined threshold value, low-frequency components are determined to be dominant and thus a low-pass interpolation filter which passes low-frequency bands may be selected. When the degree of change AC_1/AC_6 is less than the predetermined threshold value, high-frequency components are determined to be dominant and thus an all-pass interpolation filter may be selected to pass high-frequency bands.

In operation S26, the predictor 14 may determine a predicted sample value of the current sample by using a reference sample of the sub-pixel unit produced by applying the interpolation filter determined by the reference sample determiner 12 in operation S24 to the reference sample and the neighboring samples. In operation S28, the predictor 14 may encode a residual value between the predicted sample value and a sample value of the current sample.

For motion compensation, the predictor 14 may produce a reconstructed sample value of the current sample by using the predicted sample value and the residual value of the current sample.

Figure 3:
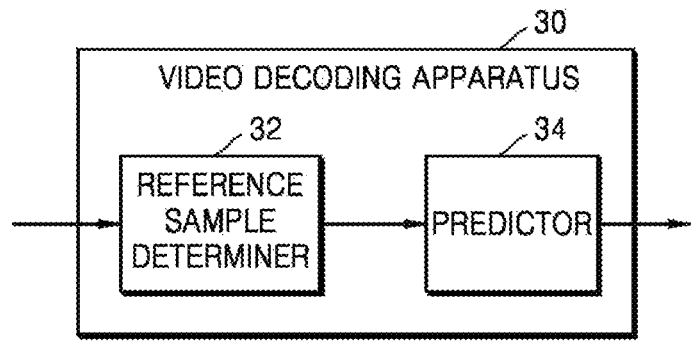
FIG. 3 illustrates a block diagram of a video decoding apparatus according to an embodiment.

FIG. 3 illustrates a block diagram of a video decoding apparatus 30 according to an embodiment.

In one embodiment, the video decoding apparatus 30 includes a reference sample determiner 32 and a predictor 34.

In one embodiment, the video decoding apparatus 30 may obtain a motion vector and a reference pixel index for a block which is in an inter-prediction mode. The video decoding apparatus 30 may determine a reference block which is included in a reference picture indicated by the reference picture index and which is indicated by the motion vector, and determine predicted sample values of a current block by using reference samples of the reference block. For more precise motion estimation, the reference block may be determined according to a motion vector of a sub-pixel unit. In order to determine reference samples of a sub-pixel unit between samples of an integer pixel unit of the reference block, the video decoding apparatus 30 may produce reference samples of a coding unit by applying an interpolation filter to the samples of the integer pixel unit.

In one embodiment, the video decoding apparatus 30 may apply an interpolation filter to a position of each of sub-pixel units to produce samples of a sub-pixel unit from the samples of the integer pixel unit. When a filter coefficient set including filter coefficients of the interpolation filter is stored in a storage unit (not shown) included in the video decoding apparatus 30, a filter coefficient set which is set for a position of each of coding units may be stored. For example, when an interpolation filter for producing reference samples of a sub-pixel unit of a ¼-pixel unit is needed, a filter coefficient set may be set for each of a ¼ pixel, a 2/4 pixel, and a ¾-pixel.

In one embodiment, the video decoding apparatus 30 may respectively set a plurality of interpolation filters with different passbands for the sub-pixel units. For example, an all-pass interpolation filter and a low-frequency band pass interpolation filter may be set for a ¼ pixel, a 2/4 pixel, and a ¾-pixel.

In one embodiment, the video decoding apparatus 30 may select one of the plurality of interpolation filters on the basis of image characteristics determined from the reference block, and produce reference samples of a sub-pixel unit. For example, a frequency band pass filter may be selectively determined for each of a ¼ pixel, a 2/4 pixel, and a ¾-pixel.

In one embodiment, the reference sample determiner 32 of the video decoding apparatus 30 may use a degree of change between reference samples of an integer pixel unit of the reference block to select one of the plurality of interpolation filters. In one embodiment, the reference sample determiner 32 may determine a degree of change between neighboring samples of at least one integer pixel unit adjacent to a reference sample of an integer pixel unit of a current sample and the reference sample. In order to predict a current sample, the reference sample determiner 32 may determine one interpolation filter among interpolation filters to reproduce reference samples of a sub-pixel unit on the basis of the degree of change between the reference samples of the integer pixel unit. As described above, the interpolation filters may have different frequency passbands.

In one embodiment, the predictor 34 of the video decoding apparatus 30 may determine a predicted sample value of a current sample by using a reference sample of a sub-pixel unit obtained by applying the interpolation filter determined by the reference sample determiner 32 to a reference sample and neighboring samples.

The video decoding apparatus 30 may produce a reconstructed sample value of the current sample by using the predicted sample value of the current sample determined by the predictor 34 and a residual value. In one embodiment, the video decoding apparatus 30 may perform deblocking filtering and in-loop filtering such as a sample adaptive offset (SAO) process on the reconstructed sample value of the current sample, and store the filtered reconstructed sample value in a reconstructed-picture buffer (not shown).

A video encoding method 40 according to various embodiments, performed by the video decoding apparatus 30, will be described in greater detail with reference to FIG. 4 below.

Figure 4:
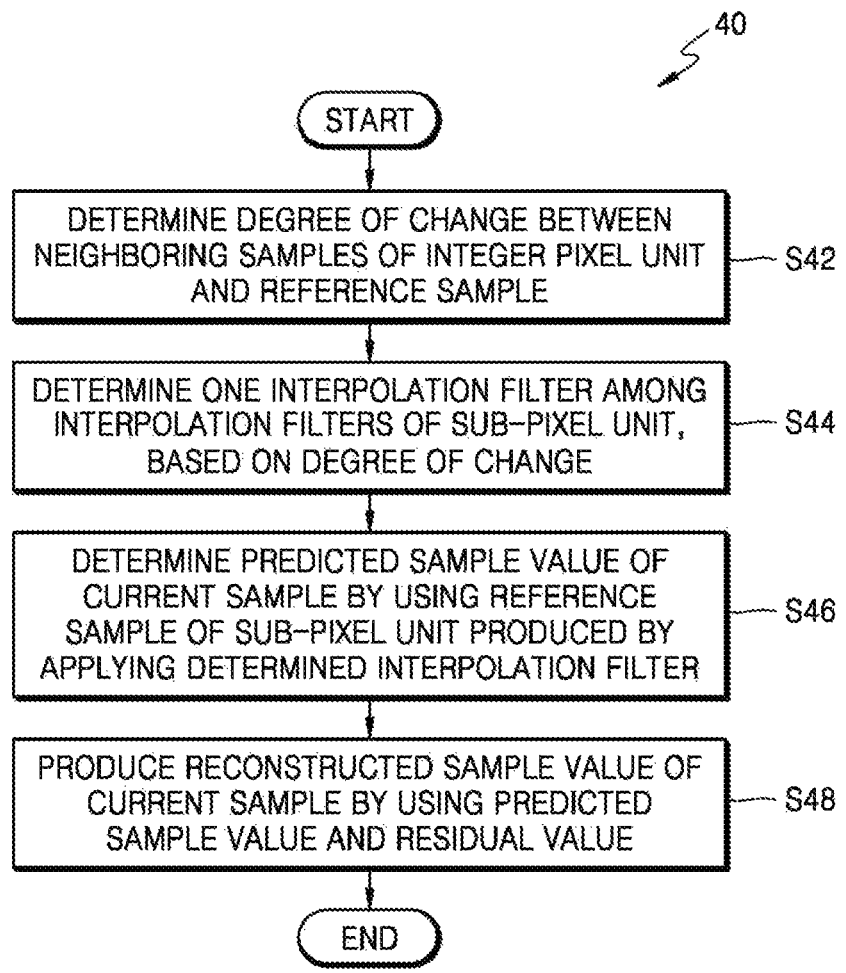
FIG. 4 illustrates a flowchart of a video decoding method according to an embodiment.

FIG. 4 is a flowchart of the video decoding method 40 according to one embodiment.

In operation S42, the reference sample determiner 32 may determine a degree of change between neighboring samples of at least one integer pixel unit adjacent to a reference sample of an integer pixel unit of a current sample and the reference sample. In operation S44, the reference sample determiner 32 may determine one interpolation filter among interpolation filters for producing reference samples of a sub-pixel unit to predict the current sample on the basis of the degree of change.

In one embodiment, the reference sample determiner 32 may determine a degree of change between reference samples by using AC components between a reference sample and neighboring samples of an integer pixel unit. The reference sample determiner 32 may select an all-pass interpolation filter which passes all frequency bands when the degree of change is large, and select a low-pass interpolation filter which passes low-frequency bands when the degree of change is small.

In one embodiment, the reference sample determiner 32 may determine the degree of change between reference samples on the basis of a ratio between low-frequency components and high-frequency components among AC components between the reference sample and the neighboring samples of the integer pixel unit. An all-pass interpolation filter which passes all frequency bands may be selected as high-frequency components are large. A low-pass interpolation filter which passes low-frequency bands may be selected as low-frequency components are small.

In one embodiment, in order to determine a degree of change between reference samples, the reference sample determiner 32 may apply DCT to a reference sample and neighboring samples of an integer pixel unit, and determine the degree of change on the basis of a ratio between low-frequency AC components and high-frequency AC components among DCT coefficients. In this case, the DCT coefficients and DCT size may be determined on the basis of an interpolation-filter tap number.

For example, when the interpolation-filter tap number is N, DCT with a size of N−1 may be applied to reference samples of an integer pixel unit to be used for interpolation filtering. By performing DCT with the size of N−1, a total of (N−1) DCT coefficients, a direct-current (DC) component, and $AC\_1, AC\_2, \ldots, AC\_(N-2)$ coefficients may be produced. In one embodiment, the reference sample determiner 32 may use, as the degree of change, a ratio $AC\_1/AC\_(N-2)$ between the AC_1 coefficient which is lowest frequency component and the AC_(N−2) coefficient which is highest frequency component among AC components.

As a concrete example, when the interpolation-filter tap number is '8', DCT with a size of 7 which is applicable to samples of seven integer pixel units may be performed, and a ratio $AC\_1/AC\_6$ between an AC_1 coefficient and an AC_6 coefficient among AC components produced by performing the DCT with the size of 7 may be used as the degree of change. When the degree of change AC_1/AC_6 is greater than a predetermined threshold value, low-frequency components are determined to be dominant and thus a low-pass interpolation filter which passes low-frequency bands may be selected. When the degree of change AC_1/AC_6 is less than the predetermined threshold value, high-frequency components are determined to be dominant and thus an all-pass interpolation filter may be selected to pass high-frequency bands.

In operation S46, the predictor 34 may determine a predicted sample value of the current sample by using a reference sample of the sub-pixel unit produced by applying the interpolation filter determined by the reference sample determiner 32 in operation S44 to the reference sample and the neighboring samples. In operation S48, the predictor 34 may produce a reconstructed sample value of the current sample by using the predicted sample value and a residual value of the current sample.

Figure 5:
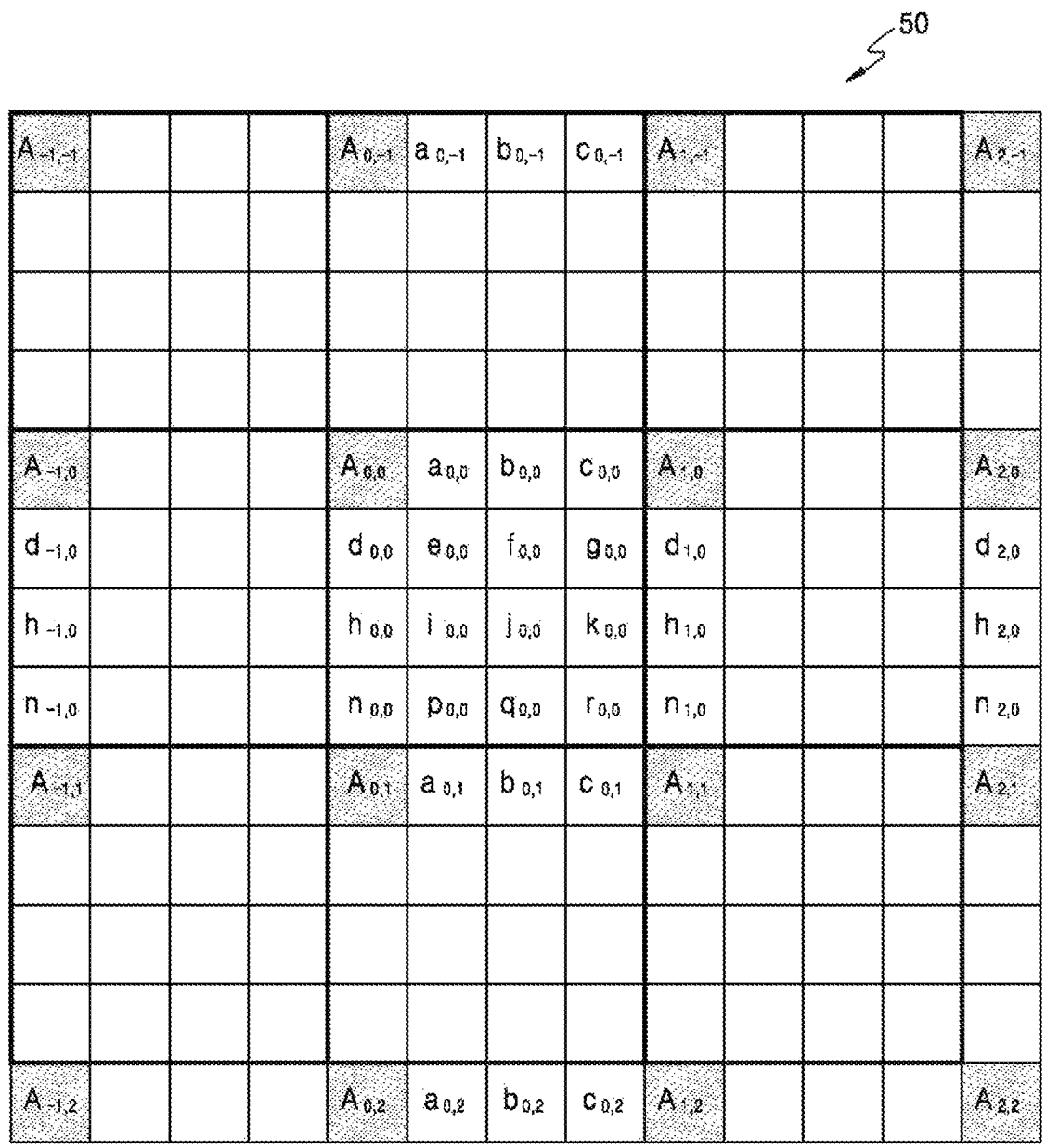
FIG. 5 illustrates a luma reference sample of an integer pixel unit and reference samples of a ¼-pixel unit.

FIG. 5 illustrates a luma reference sample of an integer pixel unit and reference samples of a ¼-pixel unit.

An interpolation filter may be applied to neighboring samples of an integer pixel unit adjacent to a reference sample. For example, the application of the interpolation filter is a process of sequentially multiplying coefficients of the interpolation filter and samples of the integer pixel unit which are arranged in a line with each other and producing the sum of results of the multiplication (or a value obtained by scaling the sum of the results of the multiplication) as an interpolated sample value. The samples of the integer pixel unit to which the interpolation filter is applied are arranged in a line with respect to the reference sample. The interpolation filter may be applied to samples, the number of which is equal to that of the coefficients of the interpolation filter.

Reference samples of a ¼-pixel unit may be produced by interpolation filtering reference samples of an integer pixel unit of a reference block 50. Among the reference samples of the reference block 50, sample values indicated by uppercase alphabetical letters, e.g., $A_{-1,-1}$, $A_{0,-1}$, $A_{1,-1}$, $A_{2,-1}$, $A_{-1,0}$, $A_{0,0}$, $A_{1,0}$, $A_{2,0}$, $A_{-1,1}$, $A_{0,1}$, $A_{1,1}$, $A_{2,1}$, $A_{-1,2}$, $A_{0,2}$, $A_{1,2}$, and $A_{2,2}$, are samples located at integer-pixel positions. Sample values indicated by lowercase alphabetical letters, e.g., $a_{0,-1}$, $b_{0,-1}$, $c_{0,-1}$, $d_{-1,0}$, $h_{-1,0}$, $n_{-1,0}$, $a_{0,0}$, $b_{0,0}$, $c_{0,0}$, $d_{0,0}$, $e_{0,0}$, $f_{0,0}$, $g_{0,0}$, $h_{0,0}$, $i_{0,0}$, $j_{0,0}$, $k_{0,0}$, $p_{0,0}$, $q_{0,0}$, $r_{0,0}$, $d_{1,0}$, $h_{1,0}$, $n_{1,0}$, $d_{2,0}$, $h_{2,0}$, $n_{2,0}$, $a_{0,1}$, $b_{0,1}$, $c_{0,1}$, $a_{0,2}$, $b_{0,2}$, and $c_{0,2}$, are samples located at sub-pixel positions.

A motion vector of a current block may include an integer component and a sub-pixel component. When a reference picture index of the current block indicates a reference picture including the reference block 50, a position of an integer sample indicated by the integer component of the motion vector may be a position of a sample of an integer pixel unit of the reference block 50.

In one embodiment, when the integer pixel component of the motion vector indicates the sample $A_{0,0}$ located at a position of an integer pixel, the sub-pixel component of the motion vector may indicate one of the samples $a_{0,0}$, $b_{0,0}$, $c_{0,0}$, $d_{0,0}$, $e_{0,0}$, $f_{0,0}$, $g_{0,0}$, $h_{0,0}$, $i_{0,0}$, $j_{0,0}$, $k_{0,0}$, $p_{0,0}$, $q_{0,0}$, and $r_{0,0}$ located at the sub-pixel positions.

When a sample at a sub-pixel position indicated by the sub-pixel component of the motion vector is the sample $a_{0,0}$, $b_{0,0}$, or $c_{0,0}$, a sample at a sub-pixel position may be produced by applying the interpolation filter to reference samples located at integer-pixel positions and in the same row as the sample indicated by the integer pixel component of the motion vector, such as the samples $A_{-1,0}$, $A_{0,0}$, $A_{1,0}$, $A_{2,0}$ located at the integer-pixel positions. However, a filter coefficient set of an interpolation filter for producing the sample $a_{0,0}$ at the sub-pixel position and a filter coefficient set of an interpolation filter for producing the sample $b_{0,0}$ at a sub-pixel position may be different from each other. Furthermore, a filter coefficient set of an interpolation filter for producing the sample $c_{0,0}$ at the sub-pixel position and a filter coefficient set of an interpolation filter for producing the sample and the filter coefficient set of the interpolation filter for producing the sample $a_{0,0}$ at the sub-pixel position may be different from each other.

Similarly, when a sample at a sub-pixel position indicated by the sub-pixel component of the motion vector is the sample motion vector is the sample $d_{0,0}$, $h_{0,0}$, or $n_{0,0}$, a sample at a sub-pixel position may be produced by applying the interpolation filter to reference samples located at integer-pixel positions and in the same column as the sample indicated by the integer pixel component of the motion vector, such as the samples $A_{0,-1}$, $A_{0,0}$, $A_{0,1}$, $A_{0,2}$ located at the integer-pixel positions. However, a filter coefficient set of an interpolation filter for producing the sample $d_{0,0}$ at the sub-pixel position and a filter coefficient set of an interpolation filter for producing the sample $h_{0,0}$ at the sub-pixel position may be different from each other. Furthermore, a filter coefficient set of an interpolation filter for producing the sample $h_{0,0}$ at the sub-pixel position and a filter coefficient set of an interpolation filter for producing the sample $n_{0,0}$ at the sub-pixel position may be different from each other.

In one embodiment, an interpolation filter to be used by the video encoding apparatus 10 and the video decoding apparatus 30 to produce reference samples for motion compensation (prediction) may be selectively determined according to a degree of change between samples of a reference block, as well as positions of sub-pixel samples.

For example, a filter coefficient set of an all-pass interpolation filter for retaining high-frequency components of reference samples and a filter coefficient set of a low-frequency band pass interpolation filter for retaining only low-frequency components may be different from each other. For example, a filter coefficient set of an all-pass interpolation filter and a filter coefficient set of a low frequency band pass interpolation filter for producing the sample $a_{0,0}$ at the sub-pixel position, a filter coefficient set of an all-pass interpolation filter and a filter coefficient set of a low frequency band pass interpolation filter for producing the sample b0,0 at the sub-pixel position, and a filter coefficient set of an all-pass interpolation filter and a filter coefficient set of a low frequency band pass interpolation filter for producing the sample c0,0 at the sub-pixel position may be differently set.

Figure 6:
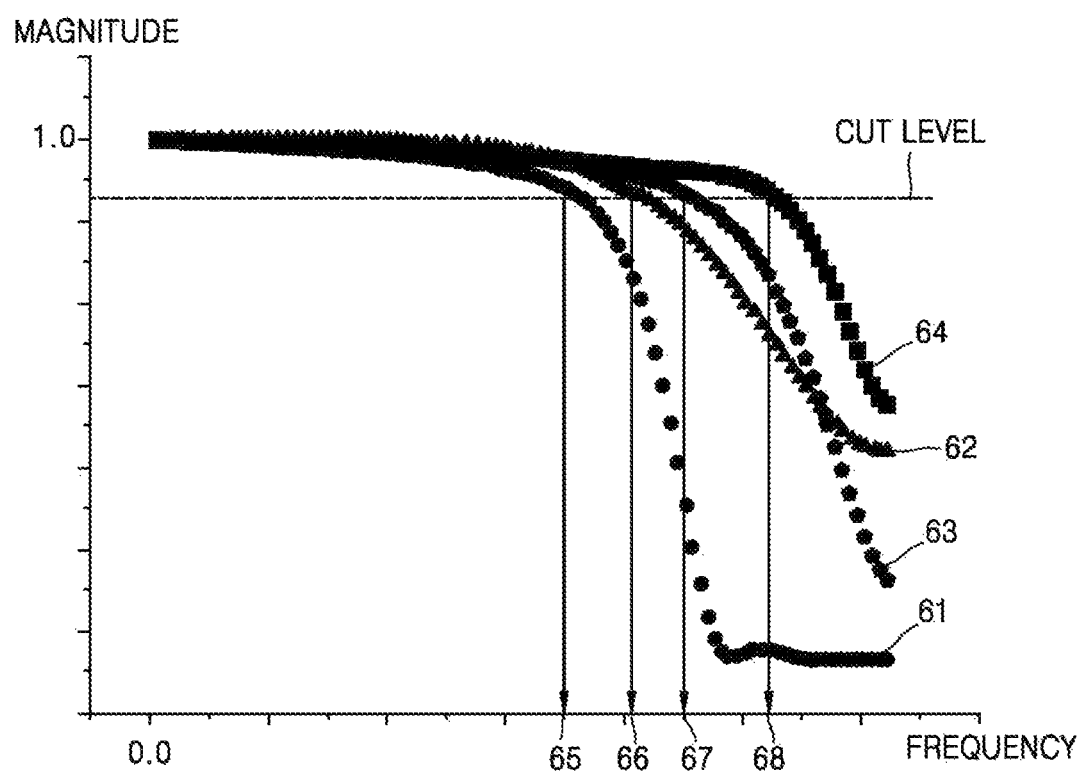
FIG. 6 illustrates passbands of interpolation filters.

FIG. 6 illustrates passbands of interpolation filters.

A graph of FIG. 6 shows response curves 61, 62, 63, and 64 of interpolation filters with different passbands. A horizontal axis of the graph of FIG. 6 represents a frequency axis. A vertical axis of the graph of FIG. 6 represents the magnitude of each of these response curves.

An ideal interpolation filter has a response curve having a size of 1 at all frequency bands but cannot be actually implemented. Generally, as a frequency increases from '0', the sizes of the response curves 61, 62, 63, and 64 of the interpolation filters decrease from '1'. When the sizes of these response curves of the interpolation filters decrease to a cut level, starting from '1', a frequency at the cut level may be considered as a passband of the interpolation filters.

That is, the pass band of the interpolation filter having the response curve 61 may be a frequency of 65, the pass band of the interpolation filter having the response curve 62 may be a frequency of 66, the pass band of the interpolation filter having the response curve 63 may be a frequency of 67, and the pass band of the interpolation filter having the response curve 64 may be a frequency of 68.

According to the response curves 61, 62, 63, and 64 of the graph of FIG. 6, high-frequency components are less retained by the interpolation filter having the response curve 61 of a lowest-frequency passband than the other interpolation filters but are better retained by the interpolation filter having the response curve 64 of a highest-frequency passband than the other interpolation filters.

Thus, the interpolation filter having the response curve 61 may be used as an interpolation filter for passing low-frequency bands, and the interpolation filter having the response curve 64 may be used as an interpolation filter for passing all frequency bands.

Figure 7:
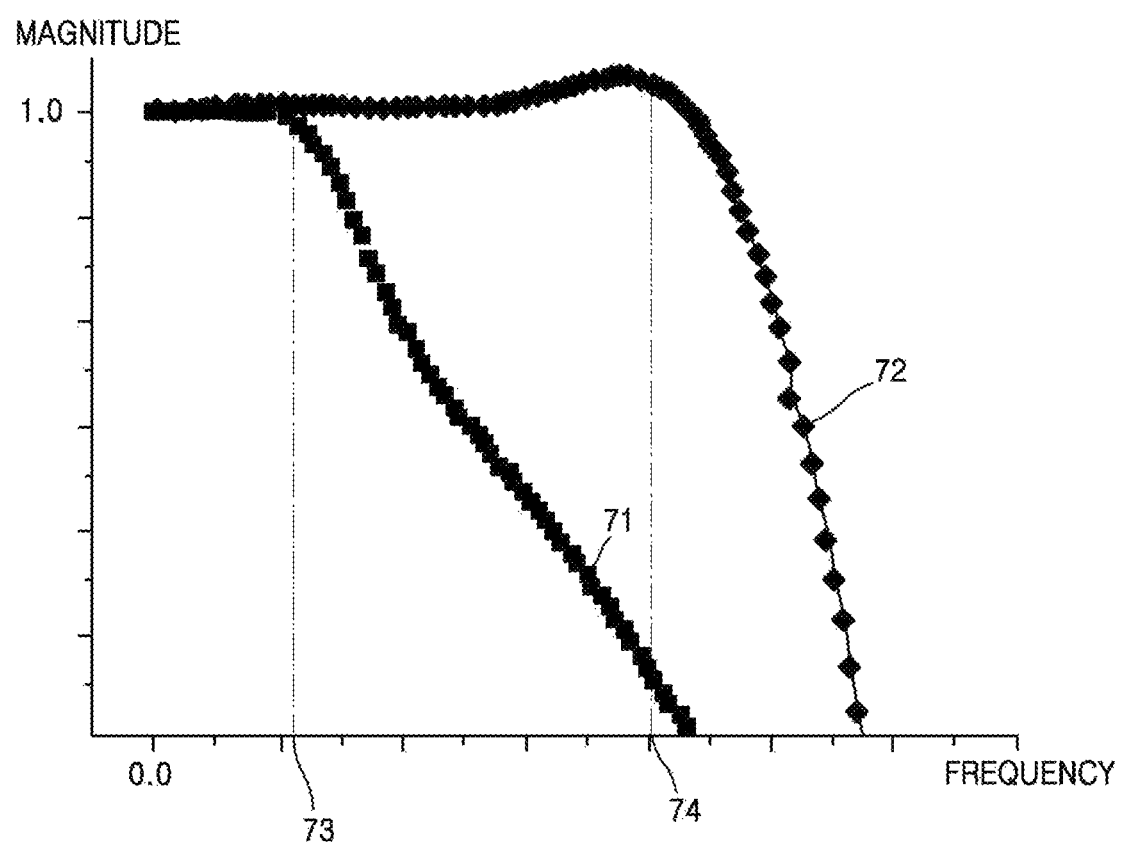
FIG. 7 is a diagram comparing an interpolation filter which passes all frequency bands and an interpolation filter which passes low-frequency bands with each other.

FIG. 7 is a diagram comparing an interpolation filter which passes all frequency bands and an interpolation filter which passes low-frequency bands with each other.

A graph of FIG. 7 shows response curves 71 and 72 of interpolation filters.

A frequency band of the response curve 71 of a first interpolation filter and a frequency band of the response curve 72 of a second interpolation filter are determined according to a cut level. As the sizes of the response curves 71 and 72 become greater or less than '1', sample values produced by the first and second interpolation filters may be more distorted than an original sample value.

According to the graph of FIG. 7, the sizes of the response curves 71 and 72 should be maintained to be close to '1' in a range of frequency bands, and a cut level thereof should be determined right before the sizes of the response curves 71 and 72 start to sharply decrease. Thus, frequencies 73 ad 74 passing the cut level right may be respectively passbands of the first interpolation filter and the second interpolation filter before the sizes of the response curves 71 and 72 start to sharply decrease from '1'.

The first interpolation filter may be used as a filter for passing low-frequency bands, since an output thereof is distorted to a great extent at high-frequency components but this filter may retain low-frequency components. The second interpolation filter may be used as a filter for passing all frequency bands since it may retain not only low-frequency components but also high-frequency components.

As described above, in one embodiment, in the video encoding apparatus 10 and the video decoding apparatus 30, a degree of change between reference samples may be considered to determine an interpolation filter to be used to determine a reference sample for inter prediction. That is, an all-pass interpolation filter may be selected when the degree of change between reference samples is greater than a predetermined threshold value and a low-frequency band pass interpolation filter may be selected when the degree of change between reference samples is equal to or less than the predetermined threshold value, based on an experimental result revealing that high-frequency components are dominant when a degree of change between reference samples is large and low-frequency components are dominant when the degree of change between reference samples is small.

In one embodiment, in order to determine an interpolation filter on the basis of the degree of change between reference samples, the video decoding apparatus 30 may determine the degree of change between reference samples by using AC components between a reference sample and neighboring samples of an integer pixel unit. For example, the degree of change between reference samples may be determined on the basis of a ratio between low-frequency components and high-frequency components among AC components between a current reference sample and neighboring reference samples adjacent to the current reference sample among the reference samples of the integer pixel unit.

The AC components used to determine the degree of change between reference samples may be obtained by applying DCT to values of the reference samples. That is, the degree of change between reference samples may be determined on the basis of a ratio between AC components of a low-frequency component and AC components of a high-frequency component among AC components of DCT coefficients produced by applying DCT on the reference samples.

In this case, the DCT coefficients and DCT size may be determined on the basis of an interpolation-filter tap number.

For example, when the interpolation-filter tap number is '8', DCT having a size of 7 which is applicable to reference samples of seven integer pixel units may be applied, and seven AC components AC1, AC2, AC3, AC4, AC5, and AC6 may be produced by performing DCT. Among the AC components, a ratio AC1/AC6 between the lowest frequency component AC1 and the highest frequency component AC6 may be used as the degree of change between reference samples.

A method of determining DCT size for determining a degree of change between reference samples according to an interpolation-filter tap number, and using a ratio between a lowest frequency component and a highest frequency component as the degree of change between reference samples has been described above as an example. However, a method of determining a degree of change between images is not limited thereto and a method well-known to one of ordinary skill in the field of image processing may be used instead.

However, it is assumed for convenience of explanation that the ratio AC1/AC6 between the lowest frequency component AC1 and the highest frequency component AC6 among the AC components produced by applying DCT having the size of 7 is used as the degree of change between reference samples when FIGS. 8 and 9 will be described below.

Figure 8:
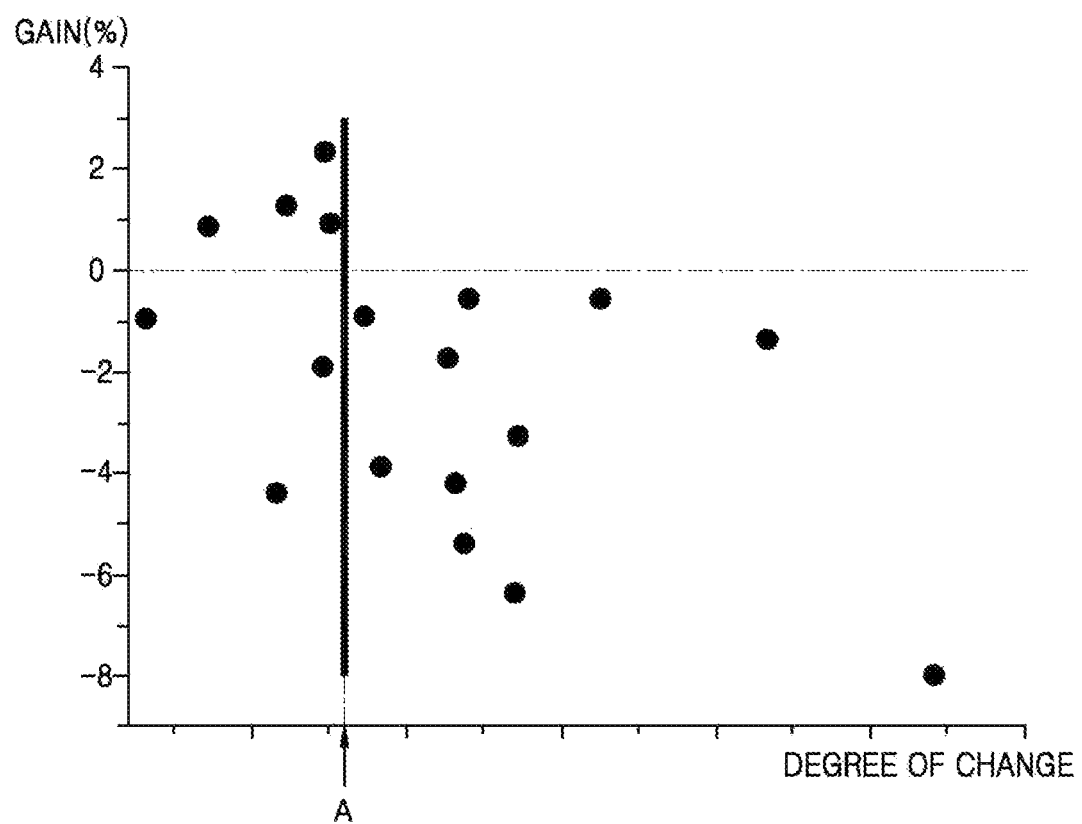
FIG. 8 illustrates a distribution of degrees of change in images, according to an embodiment.

FIG. 8 illustrates a distribution of degrees of change in images, according to an embodiment.

In a graph of FIG. 8, points represent gains of reference samples obtained when an interpolation filter for passing low-frequency bands is applied to samples of reference blocks of various images. A horizontal axis of the graph represents the degree of change AC1/AC6, and a vertical axis of the graph represents a gain (%).

As the degree of change AC1/AC6 increases toward the right of the graph, AC1 becomes greater than AC7. Reference samples in which low-frequency components are dominant are distributed at a left side of the graph. In contrast, as the degree of change AC1/AC6 decreases toward the left of the graph, AC6 becomes greater than AC1 and thus reference samples in which high-frequency components are dominant are distributed at a right side of the graph.

A gain of the interpolation filter for passing low-frequency bands decreases as the degree of change AC1/AC6 increases toward the right of the graph, and increases as the degree of change AC1/AC6 decreases toward the left of the graph.

That is, as the degree of change AC1/AC6 decreases, high-frequency components are dominant in the reference samples. Thus, when the interpolation filter for passing low-frequency bands is applied to the reference samples, all the high-frequency components are filtered and thus interpolated reference samples may be distorted to a great extent, compared to an original sample value. In contrast, as the degree of change AC1/AC6 increases, low-frequency components are dominant in the reference samples. Thus, even when the interpolation filter for passing low-frequency bands is applied to the reference samples, the low-frequency components may be effectively retained and interpolated reference samples are distorted to a small extent, compared to the original sample value.

Thus, when it is determined whether the interpolation filter for passing low-frequency bands or an all-pass interpolation filter for passing not only low-frequency bands but also high-frequency bands is to be used on the basis of the degree of change AC1/AC6 between the reference samples, a gain of an interpolated sample value may be effectively increased.

A threshold value of the degree of change AC1/AC6 between reference samples to determine whether the all-pass interpolation filter or the low-frequency band pass interpolation filter is to be used may be a fixed value but may be arbitrarily changed by a user in some embodiments.

In order to reproduce reference samples of a sub-pixel unit needed to perform inter prediction in a reference block, an interpolation filter may be applied to samples of an integer pixel unit neighboring to each of the reference samples of the sub-pixel unit in a horizontal or vertical direction. Thus, interpolation filtering may be performed several times. Accordingly, AC components may be determined by applying DCT to reference samples of integer pixel units used whenever interpolation filtering is performed.

Thus, in one embodiment, the video encoding apparatus 10 and the video decoding apparatus 30 may determine an interpolation filter for producing reference samples of a sub-pixel unit of a reference block on the basis of a degree of change between reference samples, determined in units of reference samples of a sub-pixel unit to be produced by performing interpolation filtering on a reference block. For example, whenever interpolation filtering is performed to produce each of sub-pixel reference samples of a reference block, a ratio D6/D1 between the sum D1 of coefficients of the lowest frequency component AC1 and the sum D6 of coefficients of the highest frequency component AC6 among coefficients of AC components obtained by applying DCT on reference samples of an integer pixel unit may be used as the degree of change between reference samples.

Figure 9:
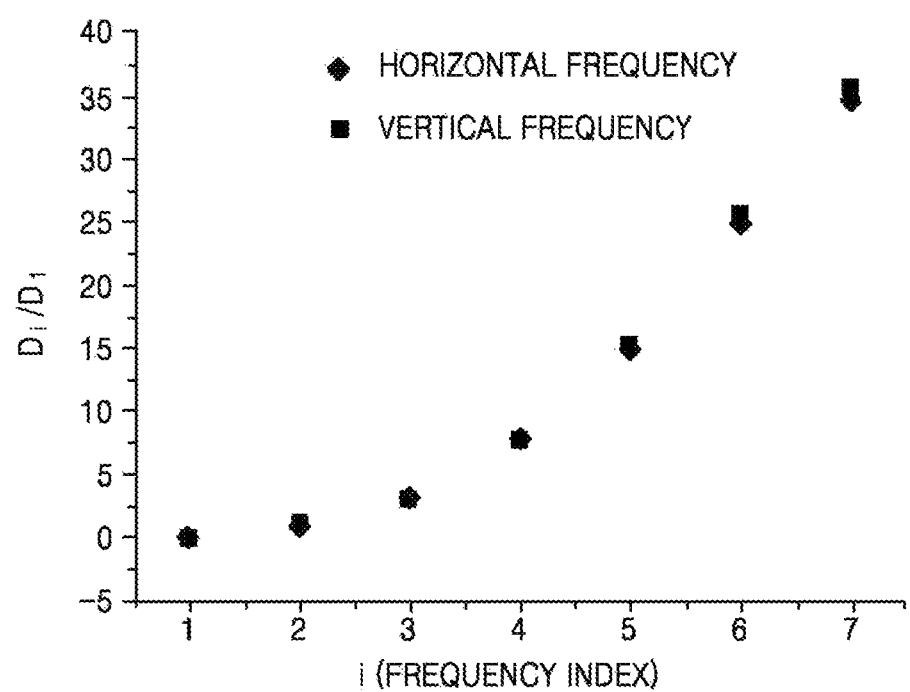
FIG. 9 illustrates a distribution of degrees of change according to alternating-current (AC) components, according to an embodiment.

FIG. 9 illustrates a distribution of degrees of change according to AC components, according to an embodiment.

According to a graph of FIG. 9, a degree of change between reference samples changes as AC components to be used to determine the degree of change between reference samples among six AC components of reference samples are changed. A horizontal axis of the graph of FIG. 9 represents a frequency index i (i=1, 2, . . . 6) when a frequency increases in the order of AC1, 2, . . . , 6. A vertical axis of the graph of FIG. 9 represents a ratio Di/D1 of the sum Di of ACi coefficients to the sum D1 of AC1 coefficients in a reference region.

According to the graph of FIG. 9, the ratio Di/D1 of the sum Di of the ACi coefficients to the sum D1 of the AC1 coefficients increases as the frequency index increases. This is a trend occurring at all horizontal and vertical frequencies of reference samples. Thus, it may be determined that a value obtained by comparing the sum D1 of the coefficients of a lowest frequency component AC1 and the sum D6 of coefficients of a highest frequency component AC6 with each other most clearly shows the degree of change between reference samples.

Thus, in one embodiment, the video encoding apparatus 10 and the video decoding apparatus 30 may selectively an interpolation filter among interpolation filters with different passbands to determine a reference sample for inter prediction on the basis of the degree of change D6/D1 between reference samples which is a value obtained by comparing the sum D1 of the coefficients of the lowest frequency component AC1 and the sum D6 of the coefficients of the highest frequency component AC6.

An embodiment in which an interpolation filter is selectively determined on the basis of the degree of change AC6/AC1 between reference samples to perform interpolating filtering to produce a reference sample has been described above with reference to FIG. 8. Furthermore, an embodiment in which an interpolation filter is selectively determined on the basis of the degree of change AC6/AC1 between reference samples when interpolation filtering is performed a plurality of numbers of times to produce reference samples from a reference block has been described above with reference to FIG. 9. As described above, the size of a reference region considered to selectively determine an interpolation filter may include at least one among one reference sample, a block group including one or more reference blocks, a slice, a slice segment, a picture, and a sequence. When reference samples of a sub-pixel unit are determined by producing them by performing interpolation filtering once or more in a reference region, an interpolation filter may be selectively determined on the basis of a ratio between the sum of ACi coefficients and the sum of AC1 coefficients whenever interpolation filtering is performed.

Here, the ACi coefficients may be coefficients of a highest frequency component among AC components between a reference sample and neighboring samples to which an interpolation filter is applied.

In the video encoding apparatus 10 and the video decoding apparatus 30 according to various embodiments described above, an interpolation filter may be selectively determined on the basis of a degree of change in each reference block to produce a reference sample of a sub-pixel unit for inter prediction. In another embodiment, a degree of change in each of reference samples included in a slice may be determined using AC components, and whether an all-pass interpolation filter or a low-frequency band pass interpolation filter is to be used may be determined according to the degree of change. An interpolation filter may be selectively determined for a reference block, a slice, or a picture on the basis of a degree of change between reference samples.

In the video encoding apparatus 10 and the video decoding apparatus 30 according to various embodiments, when a motion vector indicates a sub-pixel position during inter prediction, interpolation filtering may be performed on reference samples of an inter pixel unit of a reference picture to produce a sample value of the sub-pixel unit. As described above with reference to FIGS. 1 to 9, either an all-pass interpolation filter capable of retaining low-frequency components and high-frequency components or a interpolation filter for passing low-frequency bands when only low-frequency components need to be retained may be selected from among interpolation filters on the basis of a degree of change between reference samples.

That is, when the degree of change between reference samples shows that high-frequency components are dominant, an all-pass interpolation filter may be selected from among interpolation filters available for the video encoding apparatus 10 and the video decoding apparatus 30. When the degree of change between reference samples shows that low-frequency components are dominant, an interpolation filter for passing only low-frequency bands may be selected from among the interpolation filters available for the video encoding apparatus 10 and the video decoding apparatus 30.

In the various embodiments described above, a reference block used for inter prediction may be a coding unit or a prediction unit. The coding unit may be one of hierarchical coding trees according to a depth. The relation between a coding unit, a prediction unit, and a transformation unit which are data processing units to perform video encoding and decoding based on a hierarchical coding unit will be described in detail with reference to FIGS. 10 to 22 below.

Figure 10:
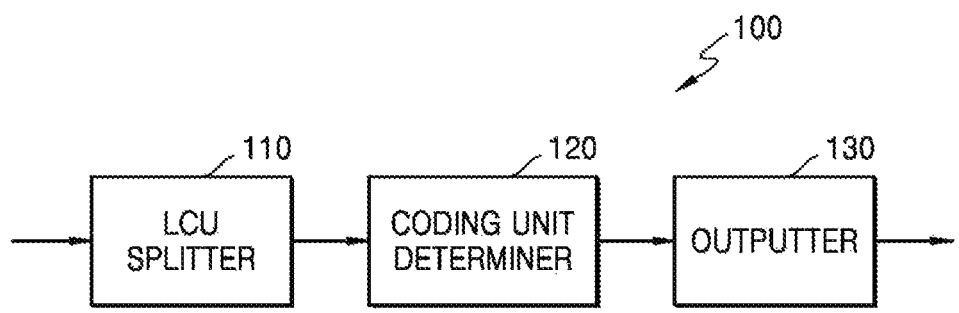
FIG. 10 illustrates a block diagram of a video encoding apparatus based on coding units according to a tree structure, according to an embodiment.

FIG. 10 illustrates a block diagram of a video encoding apparatus based on coding units according to tree structure 100, according to an embodiment.

The video encoding apparatus based on coding units according to tree structure 100 according to the embodiment includes a coding unit determiner 120 and an output unit 130. Hereinafter, for convenience of description, the video encoding apparatus based on coding units according to tree structure 100 according to the embodiment will be abbreviated to the 'video encoding apparatus 100'.

The coding unit determiner 120 may split a current picture based on a largest coding unit that is a coding unit having a maximum size for a current picture of an image If the current picture is larger than the largest coding unit, image data of the current picture may be split into the at least one largest coding unit. The largest coding unit according to various embodiments may be a data unit having a size of 32×32, 64×64, 128×128, 256×256, etc., wherein a shape of the data unit is a square having a width and length in squares of 2.

A coding unit according to various embodiments may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit is an uppermost depth and a depth of the minimum coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to various embodiments is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. That is, the coding unit determiner 120 determines a final depth by encoding the image data in the deeper coding units according to depths, according to the largest coding unit of the current picture, and selecting a depth having the minimum encoding error. The determined final depth and image data according to largest coding units are output to the output unit 130.

The image data in the largest coding unit is encoded based on the deeper coding units corresponding to at least one depth equal to or below the maximum depth, and results of encoding the image data are compared based on each of the deeper coding units. A depth having the minimum encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 120 according to various embodiments may determine coding units having a tree structure included in the largest coding unit. The 'coding units having a tree structure' according to various embodiments include coding units corresponding to a depth determined to be the final depth, from among all deeper coding units included in the largest coding unit. A coding unit of a final depth may be hierarchically determined according to depths in the same region of the largest coding unit, and may be independently determined in different regions. Similarly, a final depth in a current region may be independently determined from a final depth in another region.

A maximum depth according to various embodiments is an index related to the number of splitting times from a largest coding unit to a smallest coding unit A first maximum depth according to various embodiments may denote the total number of splitting times from the largest coding unit to the smallest coding unit. A second maximum depth according to various embodiments may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. In this regard, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 100 according to various embodiments may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a final depth according to various embodiments, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode according to various embodiments may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, or partitions having arbitrary shapes.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 100 according to various embodiments may perform not only the transformation on the image data in a coding unit based not only on the coding unit for encoding the image data, but also may perform the transformation on the image data based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to various embodiments. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to various embodiments. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information about prediction and transformation. Accordingly, the coding unit determiner 120 not only determines a depth having a minimum encoding error but also determines a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to various embodiments, will be described in detail later with reference to FIGS. 9 through 19.

The coding unit determiner 120 may measure an encoding error of deeper coding units according to depths by using Rate-Distortion Optimization based on Lagrangian multipliers.

The output unit 130 outputs, in bitstreams, the image data of the largest coding unit, which is encoded based on the at least one depth determined by the coding unit determiner 120, and split information according to depths.

The encoded image data may be obtained by encoding residual data of an image.

The split information according to depth may include information about the depth, about the partition mode in the prediction unit, about the prediction mode, and about split of the transformation unit.

Final depth information may be defined by using split information according to depths, which indicates whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information has to be determined for a coding unit of a depth, at least one piece of split information may be determined for one largest coding unit. Also, data of the largest coding unit may vary according to locations since the data is hierarchically split according to depths, and thus a depth and split information may be set for the data.

Accordingly, the output unit 130 according to various embodiments may assign encoding information about a corresponding depth and an encoding mode to at least one of the coding unit, the prediction unit, and a minimum unit included in the largest coding unit.

The minimum unit according to various embodiments is a square data unit obtained by splitting the smallest coding unit constituting the lowermost depth by 4. Alternatively, the minimum unit according to various embodiments may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the prediction mode information and the partition size information. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information, prediction information, and slice type information, which are related to prediction.

In the video encoding apparatus 100 according to the simplest embodiment, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined in consideration of characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to various embodiments, image compression efficiency may be increased since a coding unit is adjusted while considering characteristics of an image while increasing a maximum size of a coding unit while considering a size of the image.

Figure 11:
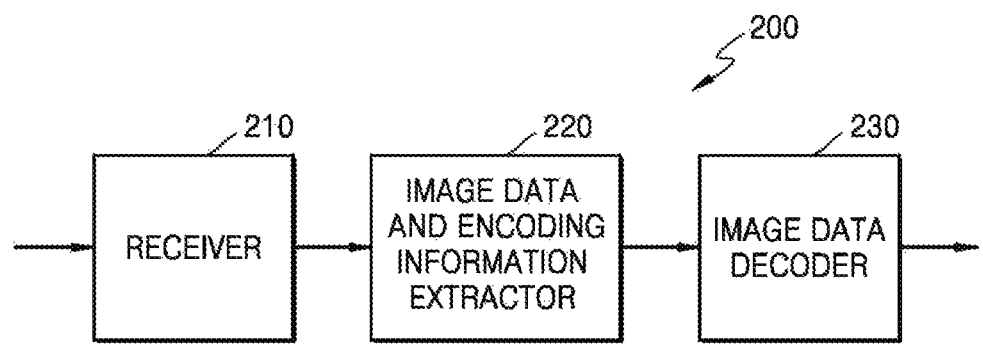
FIG. 11 illustrates a block diagram of a video decoding apparatus based on coding units according to a tree structure, according to an embodiment.

FIG. 11 illustrates a block diagram of the video decoding apparatus based on coding units according to a tree structure 200, according to various embodiments.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the 'video decoding apparatus 200'.

Definitions of various terms, such as a coding unit, a depth, a prediction unit, a transformation unit, and various split information, for decoding operations of the video decoding apparatus 200 according to various embodiments are identical to those described with reference to FIG. 10 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts a final depth and split information for the coding units having a tree structure according to each largest coding unit, from the parsed bitstream. The extracted final depth and split information are output to the image data decoder 230. That is, the image data in a bitstream is split into the largest coding unit so that the image data decoder 230 decodes the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each largest coding unit extracted by the image data and encoding information extractor 220 is a depth and split information determined to generate a minimum encoding error when an encoder, such as the video encoding apparatus 100 according to various embodiments, repeatedly performs encoding for each deeper coding unit according to depths according to each largest coding unit. Accordingly, the video decoding apparatus 200 may reconstruct an image by decoding data according to an encoding method that generates the minimum encoding error.

Since encoding information according to various embodiments about a depth and an encoding mode may be assigned to a predetermined data unit from among a corresponding coding unit, a prediction unit, and a minimum unit, the image data and encoding information extractor 220 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 230 may reconstruct the current picture by decoding the image data in each largest coding unit based on the depth and the split information according to the largest coding units. That is, the image data decoder 230 may decode the encoded image data, based on a read partition mode, a prediction mode, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each largest coding unit. Via the inverse transformation, a pixel value of a spatial region of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 12:
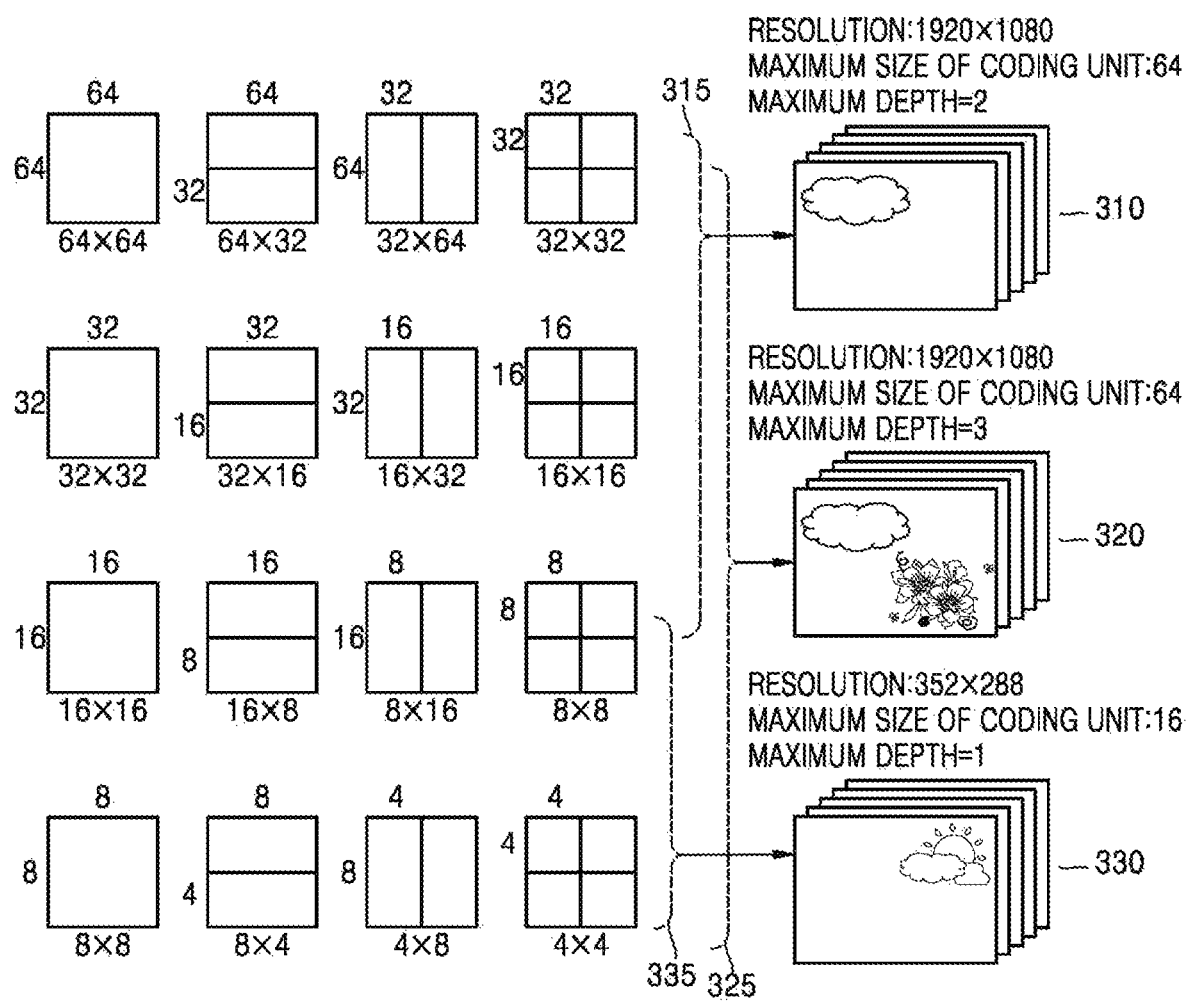
FIG. 12 illustrates a concept of coding units, according to an embodiment.

FIG. 12 illustrates a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 12 denotes a total number of splits from a largest coding unit to a smallest coding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. Since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 13:
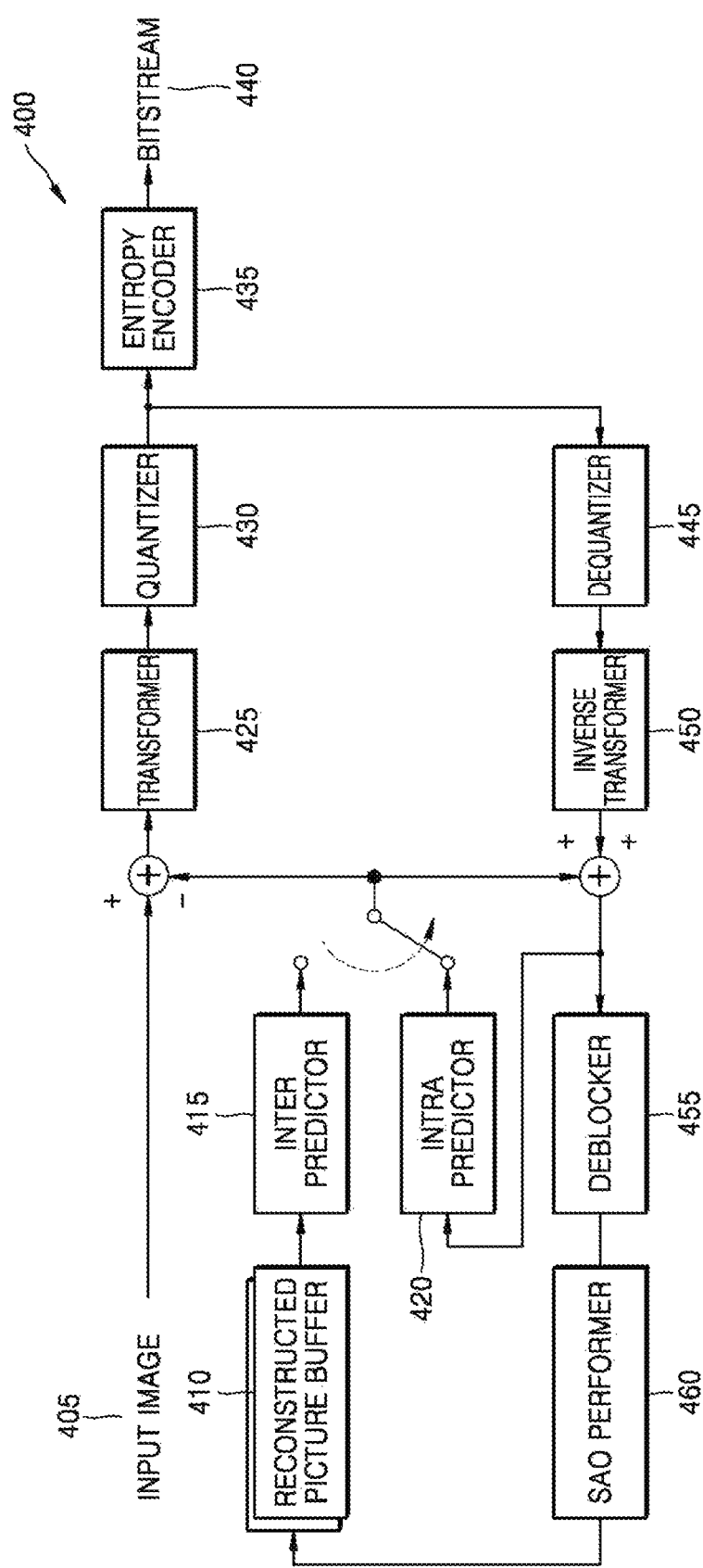
FIG. 13 illustrates a block diagram of a video encoder based on coding units, according to an embodiment.

FIG. 13 is a block diagram of an image encoder 400 based on coding units, according to various embodiments.

The image encoder 400 according to various embodiments performs operations of the coding unit determiner 120 of the video encoding apparatus 100 so as to encode image data. In other words, an intra predictor 420 performs intra prediction on coding units in an intra mode, from among a current frame 405, per prediction unit, and an inter predictor 415 performs inter prediction on coding units in an inter mode by using the current image 405 and a reference image obtained by a reconstructed picture buffer 410, per prediction unit. The current picture 405 may be split into largest coding units, and then the largest coding units may be sequentially encoded. In this regard, the largest coding unit that is to be split into coding units having a tree structure may be encoded.

Residual data is generated by subtracting prediction data of a coding unit of each mode output from the intra predictor 420 or the inter predictor 415 from data of the current image 405 to be encoded, and the residual data is output as a quantized transformation coefficient through a transformer 425 and a quantizer 430 per transformation unit. The quantized transformation coefficient is reconstructed as the residue data in a spatial domain through an inverse-quantizer 445 and an inverse-transformer 450. The reconstructed residue data in the spatial domain is added to the prediction data of the coding unit of each mode output from the intra predictor 420 or the inter predictor 415 to be reconstructed as data in a spatial domain of the coding unit of the current image 405. The reconstructed data in the spatial domain is generated as a reconstructed image through a deblocking unit 455 and an SAO performer 460. The generated reconstructed image is stored in the reconstructed picture buffer 410. Reconstructed images stored in the reconstructed picture buffer 410 may be used as a reference image for inter prediction of another image. The quantized transformation coefficient obtained through the transformer 425 and the quantizer 430 may be output as a bitstream 440 through an entropy encoder 435.

In order for the image encoder 400 according to various embodiments to be applied in the video encoding apparatus 100, components of the image encoder 400, i.e., the inter predictor 415, the intra predictor 420, the transformer 425, the quantizer 430, the entropy encoder 435, the inverse quantizer 445, the inverse transformer 450, the deblocking unit 455, and the SAO performer 460 perform operations based on each coding unit among coding units having a tree structure per largest coding unit.

In particular, the intra predictor 420 and the inter predictor 415 may determine a partition mode and a prediction mode of each coding unit from among the coding units having a tree structure, by taking into account the maximum size and the maximum depth of a current largest coding unit, and the transformer 425 may determine whether to split a transformation unit according to a quad tree in each coding unit from among the coding units having a tree structure.

Figure 14:
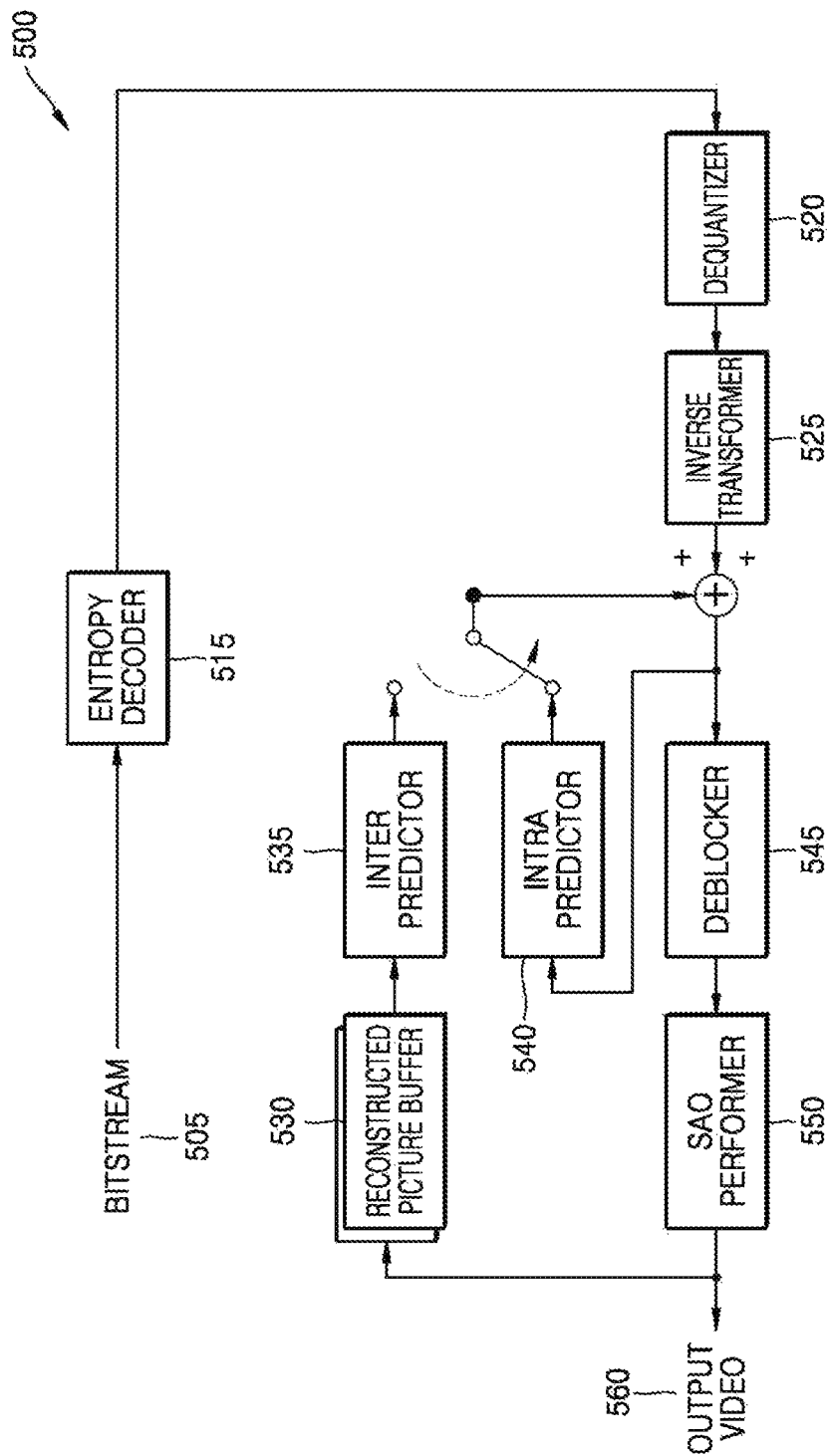
FIG. 14 illustrates a block diagram of a video decoder based on coding units, according to an embodiment.

FIG. 14 illustrates a block diagram of an image decoder 500 based on coding units, according to various embodiments.

An entropy decoder 515 parses, from a bitstream 505, encoded image data to be decoded and encoding information required for decoding. The encoded image data corresponds to a quantized transformation coefficient, and an inverse-quantizer 520 and an inverse-transformer 525 reconstruct residue data from the quantized transformation coefficient.

An intra predictor 540 performs intra prediction on a coding unit in an intra mode according to prediction units. An inter predictor 535 performs inter prediction by using a reference image with respect to a coding unit in an inter mode from among a current image, wherein the reference image is obtained by a reconstructed picture buffer 530 according to prediction units.

Prediction data and residue data regarding coding units of each mode, which passed through the intra predictor 540 and the inter predictor 535, are summed, so that data in a spatial domain regarding coding units of the current image 405 may be reconstructed, and the reconstructed data in the spatial domain may be output as a reconstructed image 560 through a deblocking unit 545 and an SAO performer 550. Reconstructed images stored in the reconstructed picture buffer 530 may be output as reference images.

In order for a picture decoder 230 of the video decoding apparatus 200 to decode the image data, operations after the entropy decoder 515 of the image decoder 500 according to an embodiment may be performed.

In order for the image decoder 500 to be applied in the video decoding apparatus 200 according to various embodiments, components of the image decoder 500, i.e., the entropy decoder 515, the inverse quantizer 520, the inverse transformer 525, the intra predictor 540, the inter predictor 535, the deblocking unit 545, and the SAO performer 550 may perform operations based on coding units having a tree structure for each largest coding unit.

In particular, the intra prediction 540 and the inter predictor 535 determine a partition mode and a prediction mode according to each of coding units having a tree structure, and the inverse transformer 525 may determine whether to split a transformation unit according to a quad-tree structure per coding unit.

For inter prediction, the inter-predictor 415 of FIG. 13 and the inter-predictor 535 of FIG. 14 may perform interpolation filtering on reference samples of an integer pixel unit of a reference picture to produce a sample value of a sub-pixel unit when a motion vector indicates a sub-pixel position. As described above with reference to FIGS. 1 to 9, either an all-pass interpolation filter capable of retaining low-frequency components and high-frequency components or an interpolation filter for passing low-frequency bands when only low-frequency components need to be retained may be selected from among interpolation filters on the basis of a degree of change between reference samples.

Figure 15:
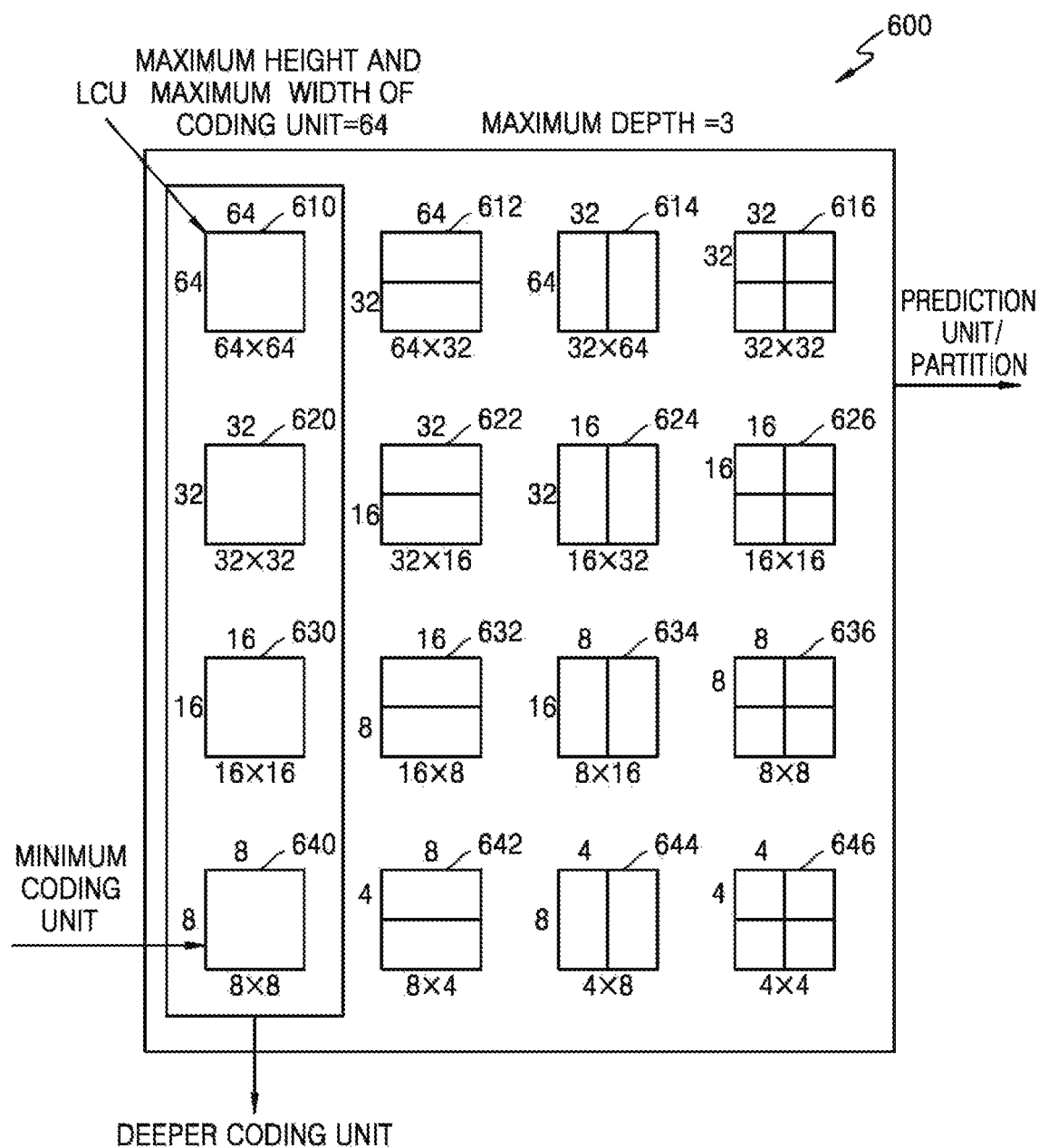
FIG. 15 illustrates coding units and partitions, according to an embodiment.

FIG. 15 illustrates coding units according to depths and partitions, according to various embodiments.

The video encoding apparatus 100 according to various embodiments and the video decoding apparatus 200 according to various embodiments use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure 600 of coding units according to various embodiments, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure 600 of coding units according to various embodiments, a height and a width of the deeper coding unit are each split.

Also, a prediction unit and partitions, which are bases for prediction encoding of each deeper coding unit, are shown along a horizontal axis of the hierarchical structure 600.

That is, a coding unit 610 is a largest coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 are present. The coding unit 640 having a size of 8×8 and a depth of 3 is a smallest coding unit.

The prediction unit and the partitions of a coding unit are arranged along the horizontal axis according to each depth. That is, if the coding unit 610 having a size of 64×64 and a depth of 0 is a prediction unit, the prediction unit may be split into partitions included in the coding unit 610 having the size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having a size of 32×32, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630 having a size of 16×16, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having a size of 8×8, i.e. a partition 640 having a size of 8×8 included in the coding unit 640, partitions 642 having a size of 8×4, partitions 644 having a size of 4×8, and partitions 646 having a size of 4×4.

In order to determine a depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a minimum encoding error may be selected for the current depth by performing encoding for each prediction unit in the coding units corresponding to the current depth, along the horizontal axis of the hierarchical structure 600. Alternatively, the minimum encoding error may be searched for by comparing the minimum encoding errors according to depths, by performing encoding for each depth as the depth deepens along the vertical axis of the hierarchical structure 600. A depth and a partition having the minimum encoding error in the largest coding unit 610 may be selected as the depth and a partition mode of the largest coding unit 610.

Figure 16:
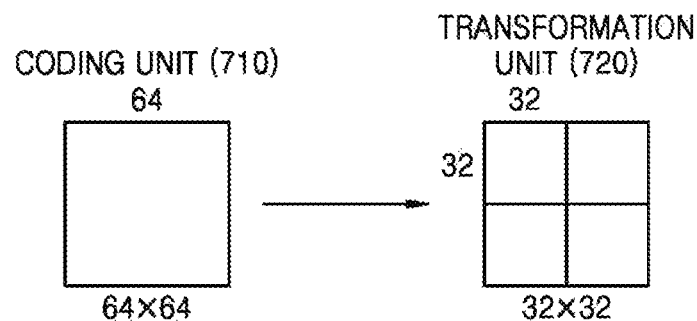
FIG. 16 illustrates a relationship between a coding unit and transformation units, according to an embodiment.

FIG. 16 illustrates a relationship between a coding unit and transformation units, according to various embodiments.

The video encoding apparatus 100 according to various embodiments or the video decoding apparatus 200 according to various embodiments encodes or decodes an image according to coding units having sizes less than or equal to a largest coding unit for each largest coding unit. Sizes of transformation units for transformation during encoding may be selected based on data units that are not larger than a corresponding coding unit.

For example, in the video encoding apparatus 100 according to various embodiments or the video decoding apparatus 200 according to various embodiments, if a size of a coding unit 710 is 64×64, transformation may be performed by using transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the minimum coding error with respect to an original image may be selected.

Figure 17:
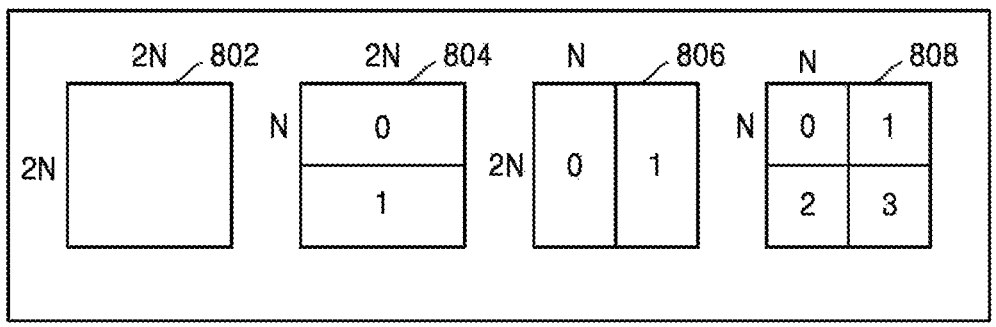
FIG. 17 illustrates a plurality of pieces of encoding information, according to an embodiment.
Figure 17:
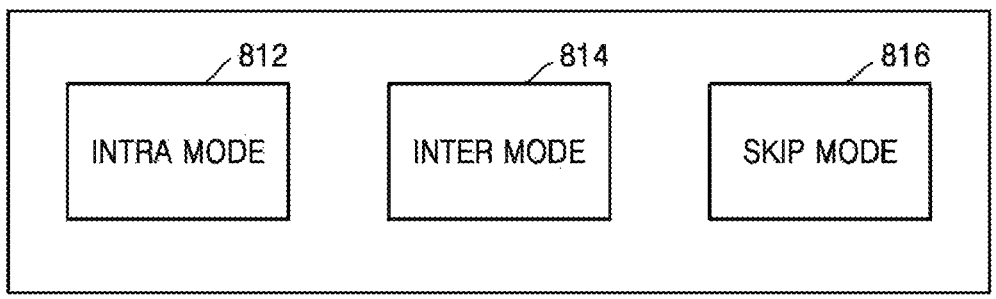
Figure 17:
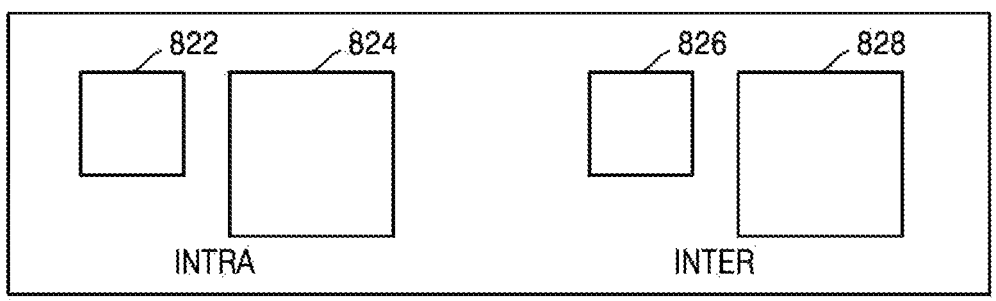

FIG. 17 illustrates a plurality of pieces of encoding information, according to various embodiments.

The output unit 130 of the video encoding apparatus 100 according to an embodiment may encode and transmit, as split information, partition mode information 800, prediction mode information 810, and transformation unit size information 820 for each coding unit corresponding to a depth.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 represents a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the partition mode information 800, the prediction mode information 810, and the transformation unit size information 820 for decoding, according to each deeper coding unit.

Figure 18:
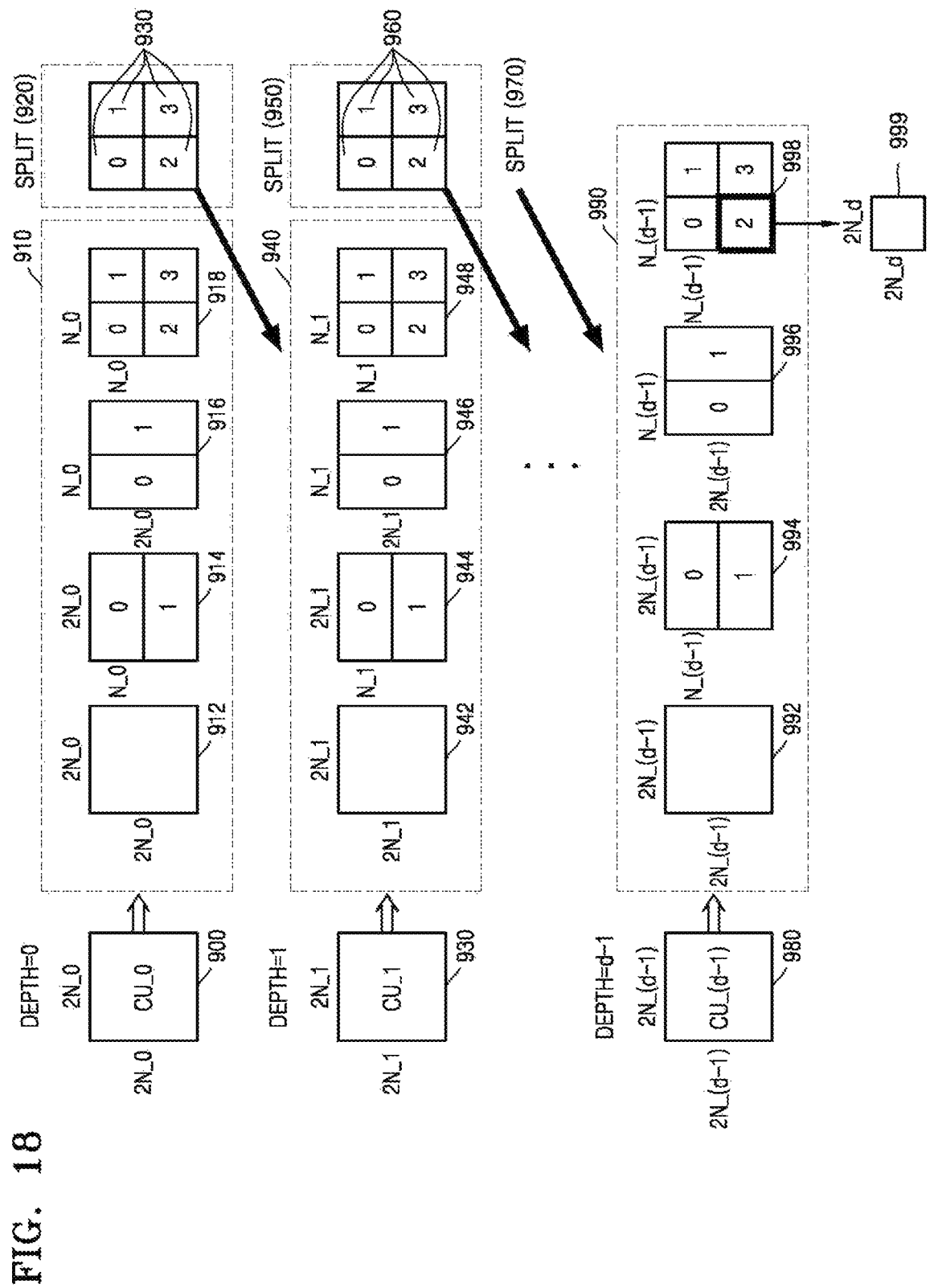
FIG. 18 illustrates coding units, according to an embodiment.

FIG. 18 illustrates deeper coding units according to depths, according to various embodiments.

Split information may be used to indicate a change in a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. Only the partition modes 912, 914, 916, and 918 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 912, 914, and 916 having the sizes of 2N_0×2N_0, 2N_0×N_0 and N_0×2N_0, the prediction unit 910 may not be split into a lower depth.

If the encoding error is the smallest in the partition mode 918, a depth is changed from 0 to 1 to split the partition mode 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d-1, and split information may be set until when a depth corresponds to d-2. That is, when encoding is performed up to when the depth is d-1 after a coding unit corresponding to a depth of d-2 is split (in operation 970), a prediction unit 990 for prediction encoding a coding unit 980 having a depth of d-1 and a size of 2N_(d-1)×2N_(d-1) may include partitions of a partition mode 992 having a size of 2N_(d-1)×2N_(d-1), a partition mode 994 having a size of 2N_(d-1)×N_(d-1), a partition mode 996 having a size of N_(d-1)×2N_(d-1), and a partition mode 998 having a size of N_(d-1)×N_(d-1).

Prediction encoding may be repeatedly performed on one partition having a size of 2N_(d-1)×2N_(d-1), two partitions having a size of 2N_(d-1)×N_(d-1), two partitions having a size of N_(d-1)×2N_(d-1), four partitions having a size of N_(d-1)×N_(d-1) from among the partition modes so as to search for a partition mode having a minimum encoding error.

Even when the partition type 998 having the size of N_(d-1)×N_(d-1) has the minimum encoding error, since a maximum depth is d, a coding unit CU_(d-1) having a depth of d-1 is no longer split into a lower depth, and a depth for the coding units constituting a current largest coding unit 900 is determined to be d-1 and a partition mode of the current largest coding unit 900 may be determined to be N_(d-1)×N_(d-1). Also, since the maximum depth is d, split information for a coding unit 952 having a depth of d-1 is not set.

A data unit 999 may be a 'minimum unit' for the current largest coding unit. A minimum unit according to various embodiments may be a square data unit obtained by splitting a smallest coding unit having a lowermost depth by 4. By performing the encoding repeatedly, the video encoding apparatus 100 according to various embodiments may select a depth having the minimum encoding error by comparing encoding errors according to depths of the coding unit 900 to determine a depth, and set a corresponding partition type and a prediction mode as an encoding mode of the depth.

As such, the minimum encoding errors according to depths are compared in all of the depths of 0, 1, . . . , d-1, d, and a depth having a minimum encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 220 of the video decoding apparatus 200 according to various embodiments may extract and use a depth and prediction unit information about the coding unit 900 so as to decode the coding unit 912. The video decoding apparatus 200 according to various embodiments may determine a depth, in which split information is '0', as a depth by using split information according to depths, and may use, for decoding, split information about the corresponding depth.

When a depth of a largest coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units in the coding units 1010. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1760 are data units different from those in the Prediction units 1060 in terms of sizes and shapes. That is, the video encoding apparatus 100 and the video decoding apparatus 200 according to various embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition mode information, prediction mode information, and transformation unit size information. Table 1 below shows the encoding information that may be set by the video encoding apparatus 100 and the video decoding apparatus 200 according to various embodiments.

TABLE 1

Split Information 0
(Encoding on Coding Unit having Size of 2N×2N and Current Depth of d)

| Prediction Mode | Partition Mode | | Size of Transformation Unit | | Split Information 1 |
|---|---|---|---|---|---|
| | Symmetrical Partition Mode | Asymmetrical Partition Mode | Split Information 0 of Transformation Unit | Split Information 1 of Transformation Unit | |
| Intra Inter Skip (Only 2N×2N) | 2N×2N 2N×N N×2N N×N | 2N×nU 2N×nD nL×2N nR×2N | 2N×2N | N×N (Symmetrical Partition Mode) N/2×N/2 (Asymmetrical Partition Mode) | Repeatedly Encode Coding Units having Lower Depth of d + 1 |

Figure 19:
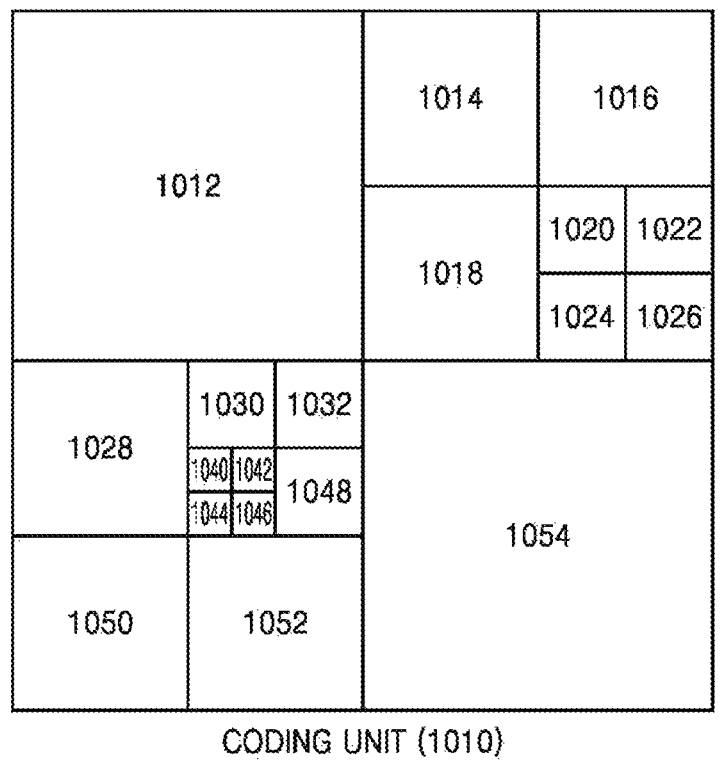
FIGS. 19, 20, and 21 illustrate a relationship between coding units, prediction units, and transformation units, according to an embodiment.
Figure 20:
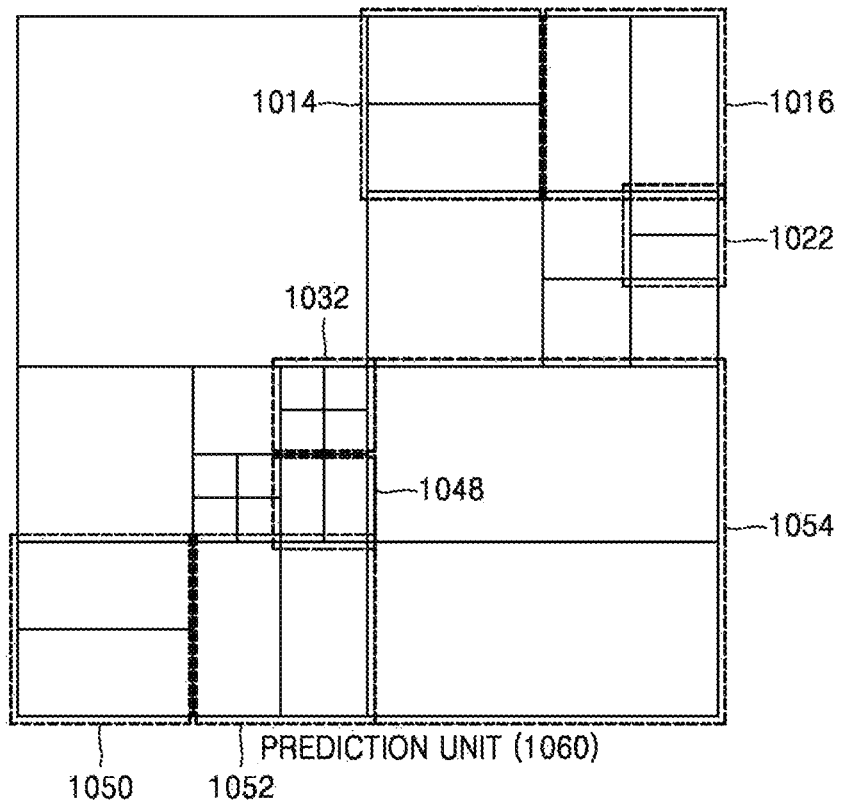
Figure 21:
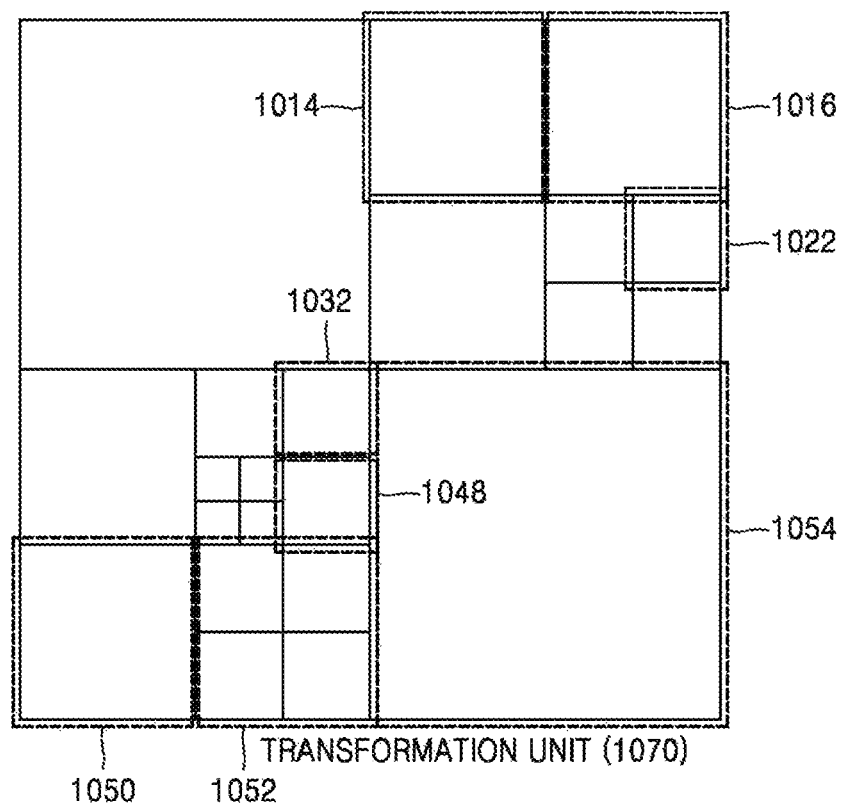

FIGS. 19, 20, and 11 illustrate a relationship between coding units, prediction units, and transformation units, according to various embodiments.

Coding units 1010 are deeper coding units according to depths determined by the video encoding apparatus 100, in a largest coding unit. Prediction units 1060 are partitions of prediction units of each of the coding units 1010 according to depths, and transformation units 1070 are transformation units of each of the coding units according to depths.

The output unit 130 of the video encoding apparatus 100 according to various embodiments may output the encoding information about the coding units having a tree structure, and the image data and encoding information extractor 220 of the video decoding apparatus 200 according to various embodiments may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure, according to various embodiments, may include at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the coding unit corresponding to the same depth by comparing a plurality of pieces of encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 22:
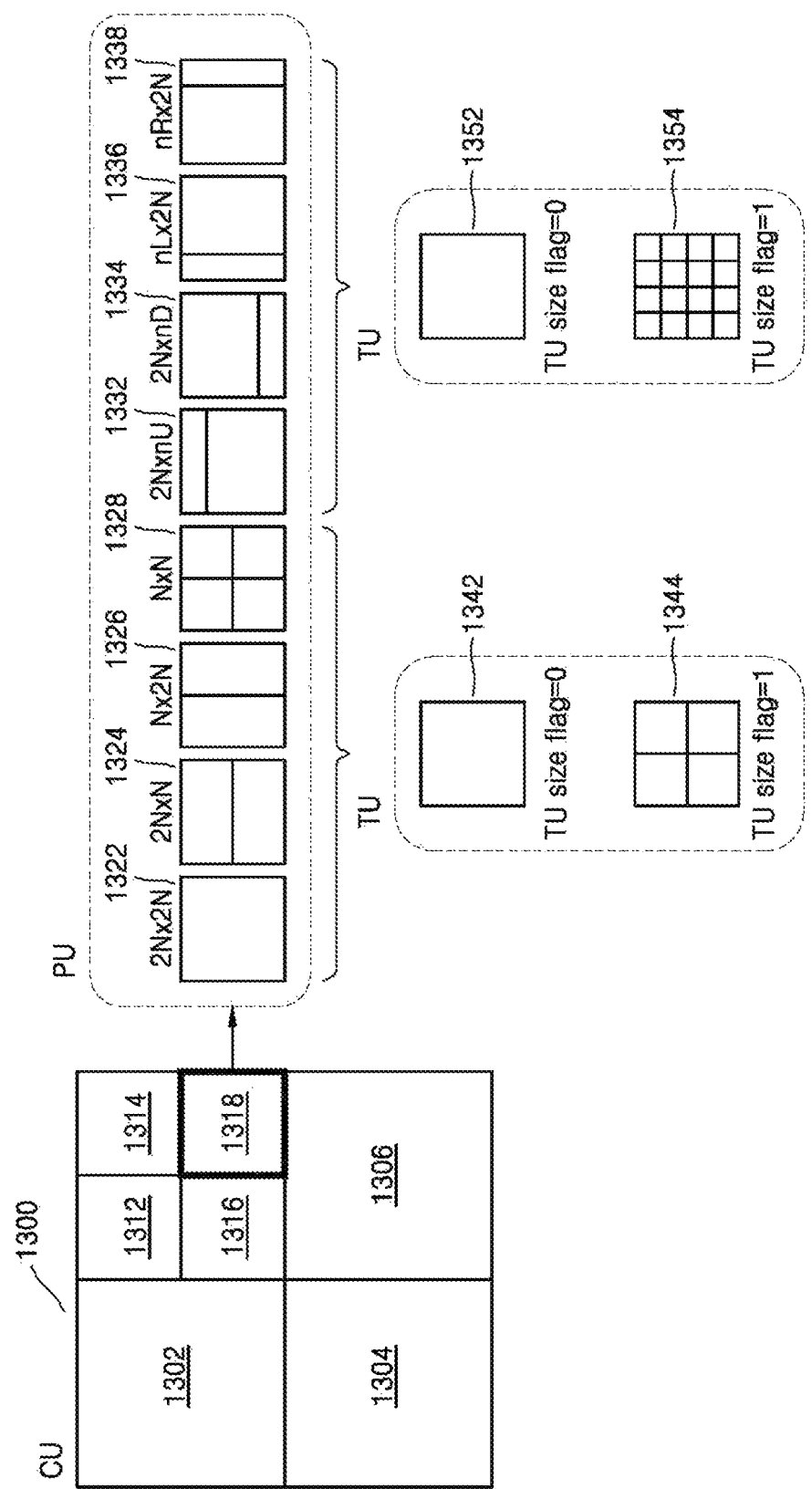
FIG. 22 illustrates a relationship between a coding unit, a prediction unit, and a transformation unit, according to encoding mode information of Table 1.

FIG. 22 illustrates a relationship between a coding unit, a prediction unit, and a transformation unit, according to encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to 0. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N may be set.

When the partition mode information is set to be one of asymmetrical partition modes 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described above with reference to FIG. 21 is a flag having a value of 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to various embodiments may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to various embodiments may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to various embodiments, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present disclosure is not limited thereto.

According to the video encoding method based on coding units of a tree structure described above with reference to FIGS. 10 through 22, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and pictures sequences may be reconstructed. The reconstructed video may be reproduced by a reproducing apparatus, may be stored in a storage medium, or may be transmitted via a network.

The one or more embodiments may be written as computer programs and may be implemented in general-use digital computers that execute the programs by using a non-transitory computer-readable recording medium. Examples of the non-transitory computer-readable recording medium include magnetic storage media (e.g., ROM, floppy disks, hard disks, etc.), optical recording media (e.g., CD-ROMs, or DVDs), etc.

For convenience of description, the inter-layer video encoding method and/or the video encoding method described above with reference to FIGS. 1A through 22 will be collectively referred to as a 'video encoding method of the present disclosure'. In addition, the inter-layer video decoding method and/or the video decoding method described above with reference to FIGS. 1A through 22 will be referred to as a 'video decoding method of the present disclosure'.

Also, a video encoding apparatus including the multilayer video encoding apparatus 10, the video encoding apparatus 100, or the image encoder 400, which has been described with reference to FIGS. 1A through 22, will be referred to as a 'video encoding apparatus of the present disclosure'. In addition, a video decoding apparatus including the multi-layer video decoding apparatus 20, the video decoding apparatus 200, or the image decoder 500, which has been descried with reference to FIGS. 1A through 22, will be collectively referred to as a 'video decoding apparatus of the present disclosure'.

A computer-readable recording medium storing a program, e.g., a disc 26000, according to various embodiments will now be described in detail.

Figure 23:
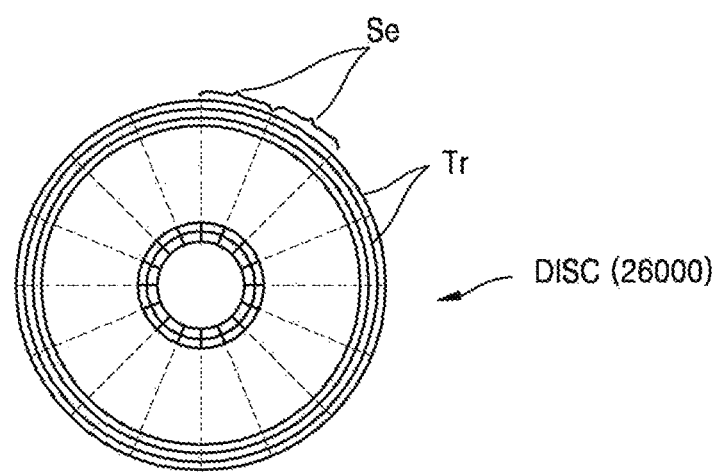
FIG. 23 illustrates an example of a physical structure of a disc in which a program is stored, according to an embodiment.

FIG. 23 illustrates an example of a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000 according to the various embodiments, a program that executes the quantization parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 24:
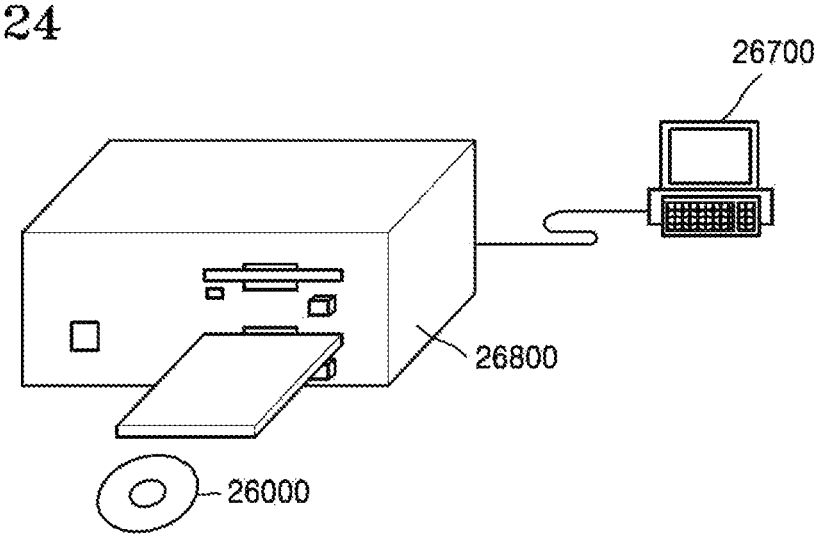
FIG. 24 illustrates a disc drive for recording and reading a program by using the disc.

FIG. 24 illustrates a disc drive 26800 for recording and reading a program by using the disc 26000. A computer system 27000 may store a program that executes at least one of a video encoding method and a video decoding method of the present disclosure, in the disc 26000 via the disc drive 26800. In order to run the program stored in the disc 26000 in the computer system 26700, the program may be read from the disc 26000 and be transmitted to the computer system 26700 by using the disc drive 26800.

The program that executes at least one of a video encoding method and a video decoding method of the present disclosure may be stored not only in the disc 26000 illustrated in FIGS. 23 and 24 but also in a memory card, a ROM cassette, or a solid state drive (SSD).

A system to which the video encoding method and the video decoding method according to the embodiments described above are applied will be described below.

Figure 25:
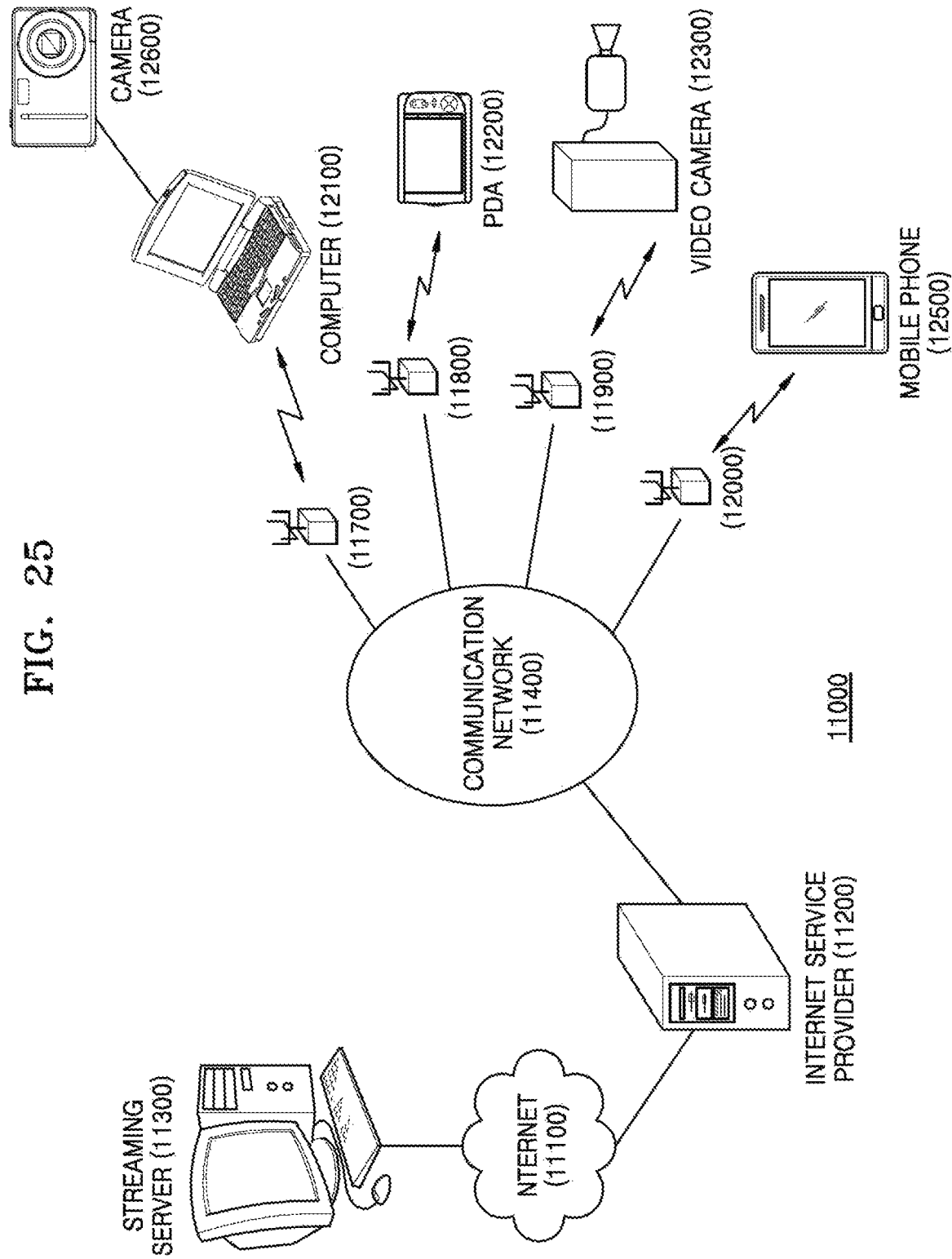
FIG. 25 illustrates an overall structure of a content supply system for providing a content distribution service.

FIG. 25 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality independent devices, such as a computer 12100, a personal digital assistant (PDA) 12200, a video camera 12300, and a mobile phone 12500, are connected to the Internet 11100 via an internet service provider 11200, a communication network of 11400, and the wireless base stations 11700, 11800, 11900, and 12000.

However, the content supply system 11000 is not limited to the structure as illustrated in FIG. 25, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 such as a digital camera is an imaging device capable of capturing both still images and video images. The video data captured by the camera 12600 may be encoded by using the camera 12600 or the computer 12100. Software that performs encoding and decoding video may be stored in a non-transitory computer-readable recording medium, e.g., a CD-ROM disc, a floppy disc, a hard disc drive, an SSD, or a memory card, which may be accessed by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

In the content supply system 11000 according to various embodiments, content data, e.g., content recorded during a concert, which has been recorded by a user using the video camera 12300, the camera 12600, the mobile phone 12500, or another imaging device is encoded and is transmitted to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

The video encoding apparatus and the video decoding apparatus of the present disclosure may be applied to encoding and decoding operations of the plurality of independent devices included in the content supply system 11000.

The mobile phone 12500 included in the content supply system 11000 according to an embodiment will now be described in greater detail with referring to FIGS. 26 and 27.

Figure 26:
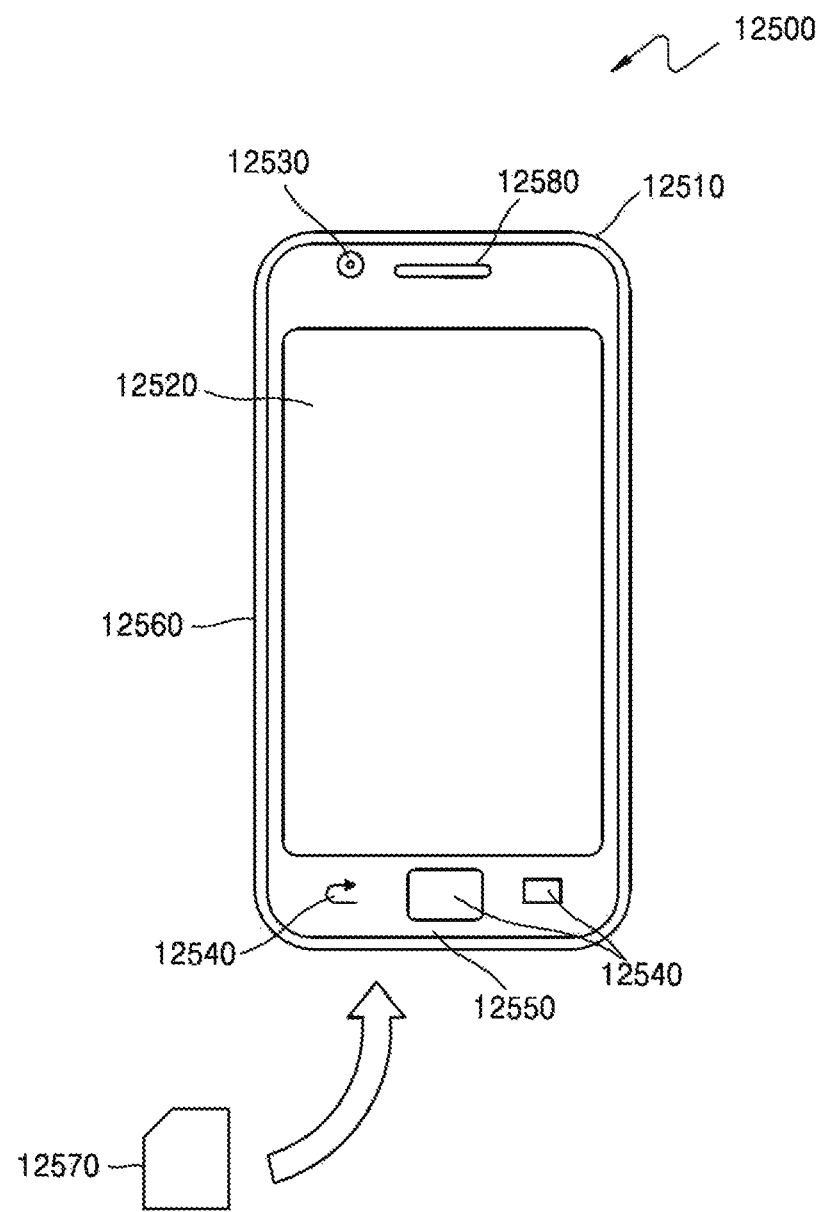
FIGS. 26 and 27 illustrate external and internal structures of a mobile phone to which the video encoding method and the video decoding method of the present disclosure are applied, according to embodiments.

FIG. 26 illustrates an external structure of the mobile phone 12500 to which the video encoding method and the video decoding method of the present disclosure are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 27:
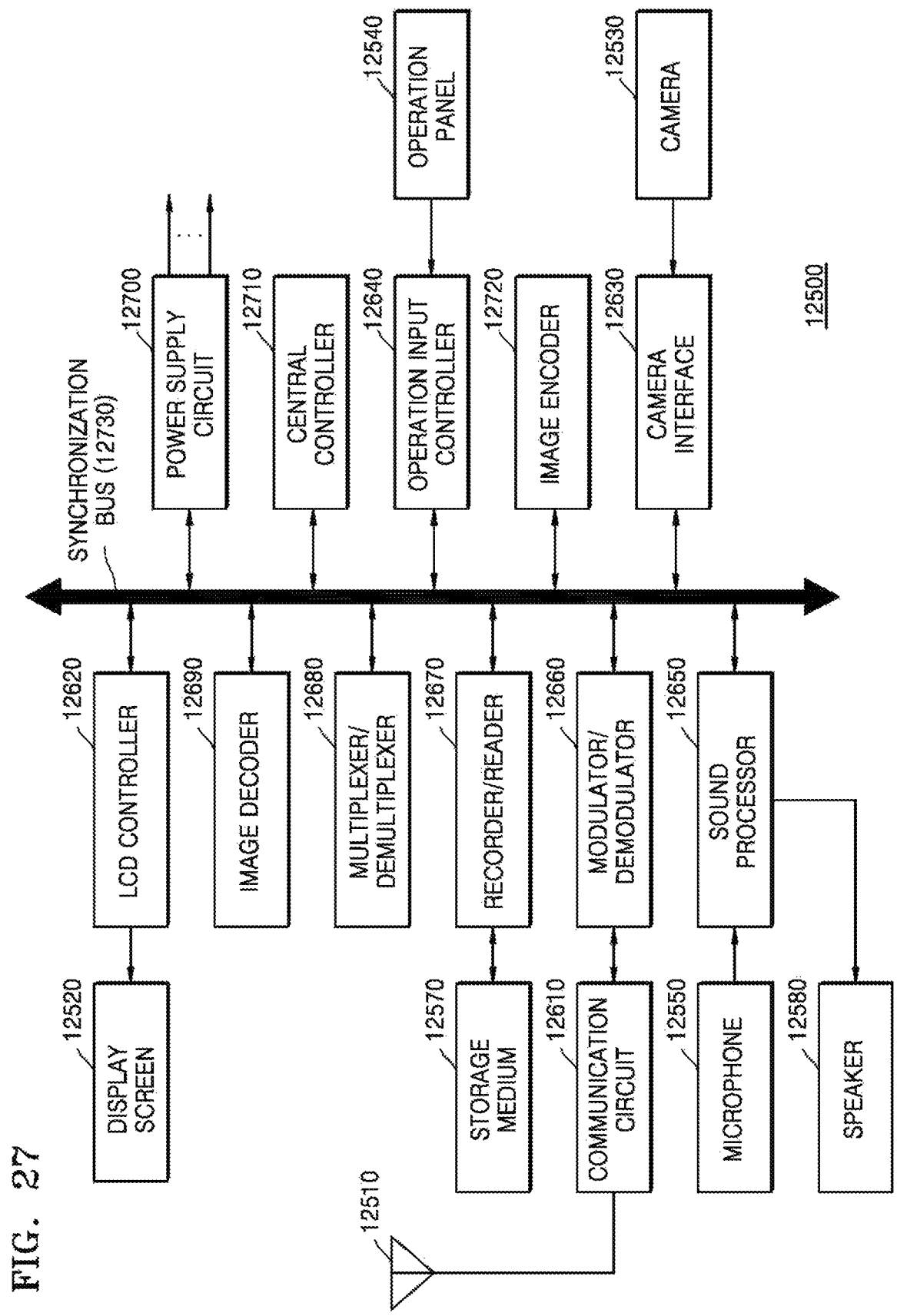

FIG. 27 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted to a digital sound signal by the sound processor 12650 by the control of the central controller 12710. The generated digital sound signal may be converted to a transmission signal through the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By the control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, by control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus 200 described above. The image decoder 12690 may decode the encoded video data so as to obtain reconstructed video data and provide the reconstructed video data to the display screen 12520 via the LCD controller 12620, by using the aforementioned video decoding method according to the embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus of the present disclosure, may be a transmitting terminal including only the video encoding apparatus, or may be a receiving terminal including only the video decoding apparatus.

Figure 28:
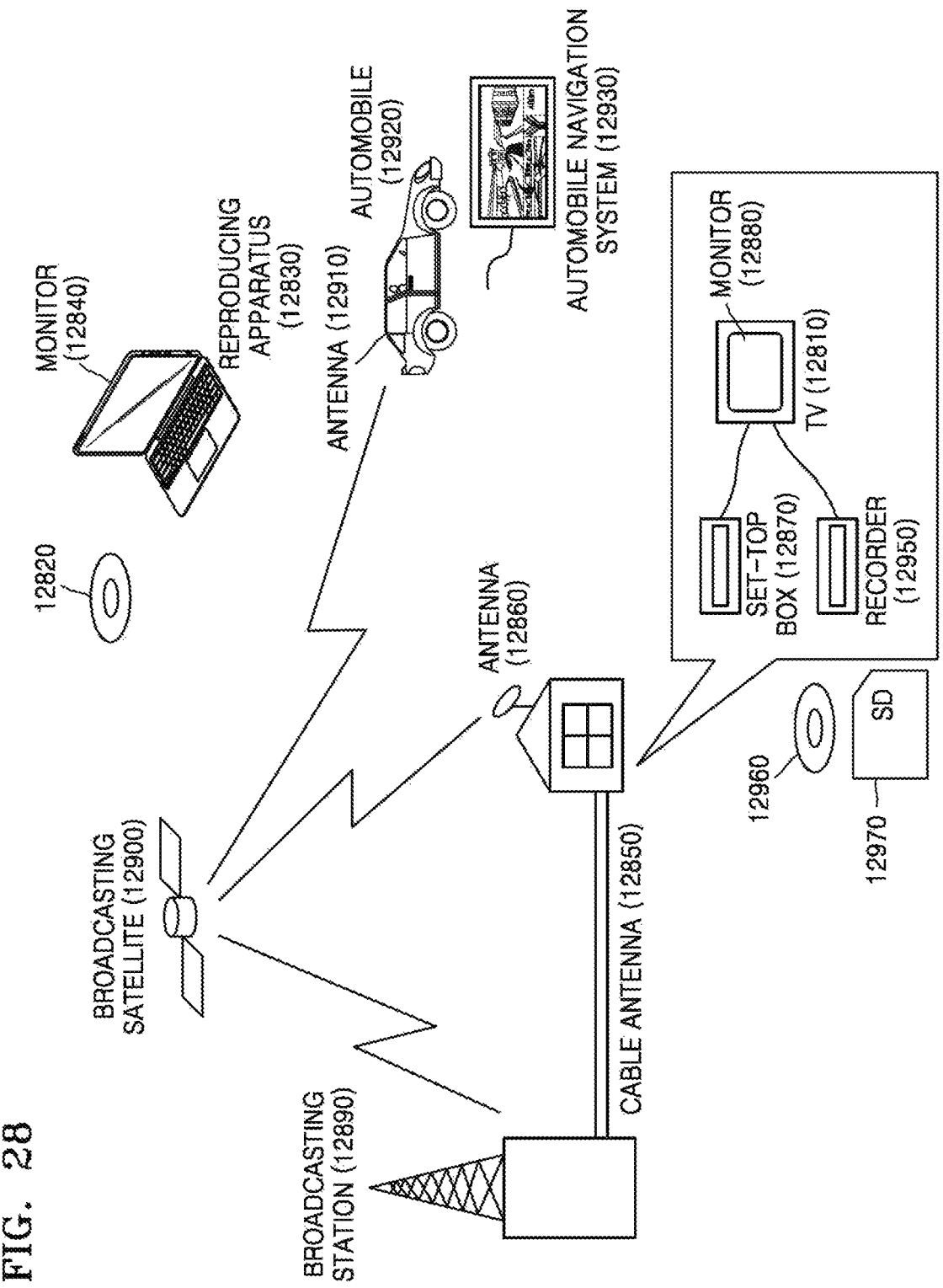
FIG. 28 illustrates a digital broadcasting system employing a communication system, according to an embodiment.

A communication system of the present disclosure is not limited to the communication system described above with reference to FIG. 24. For example, FIG. 28 illustrates a digital broadcasting system employing a communication system, according to various embodiments. The digital broadcasting system of FIG. 26 according to various embodiments may receive a digital broadcast transmitted via a satellite or a terrestrial network by using the video encoding apparatus and the video decoding apparatus of the present disclosure.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present disclosure is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present disclosure may be installed. Data output from the set-top box 12870 may also be reproduced on a TV monitor 12880.

As another example, the video decoding apparatus of the present disclosure may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus of the present disclosure and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus of the present disclosure according to various embodiments, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 28. For example, the computer 12100 and the TV receiver 12810 may not include the camera 12530, the camera interface 12630, and the image encoder 12720 of FIG. 28.

Figure 29:
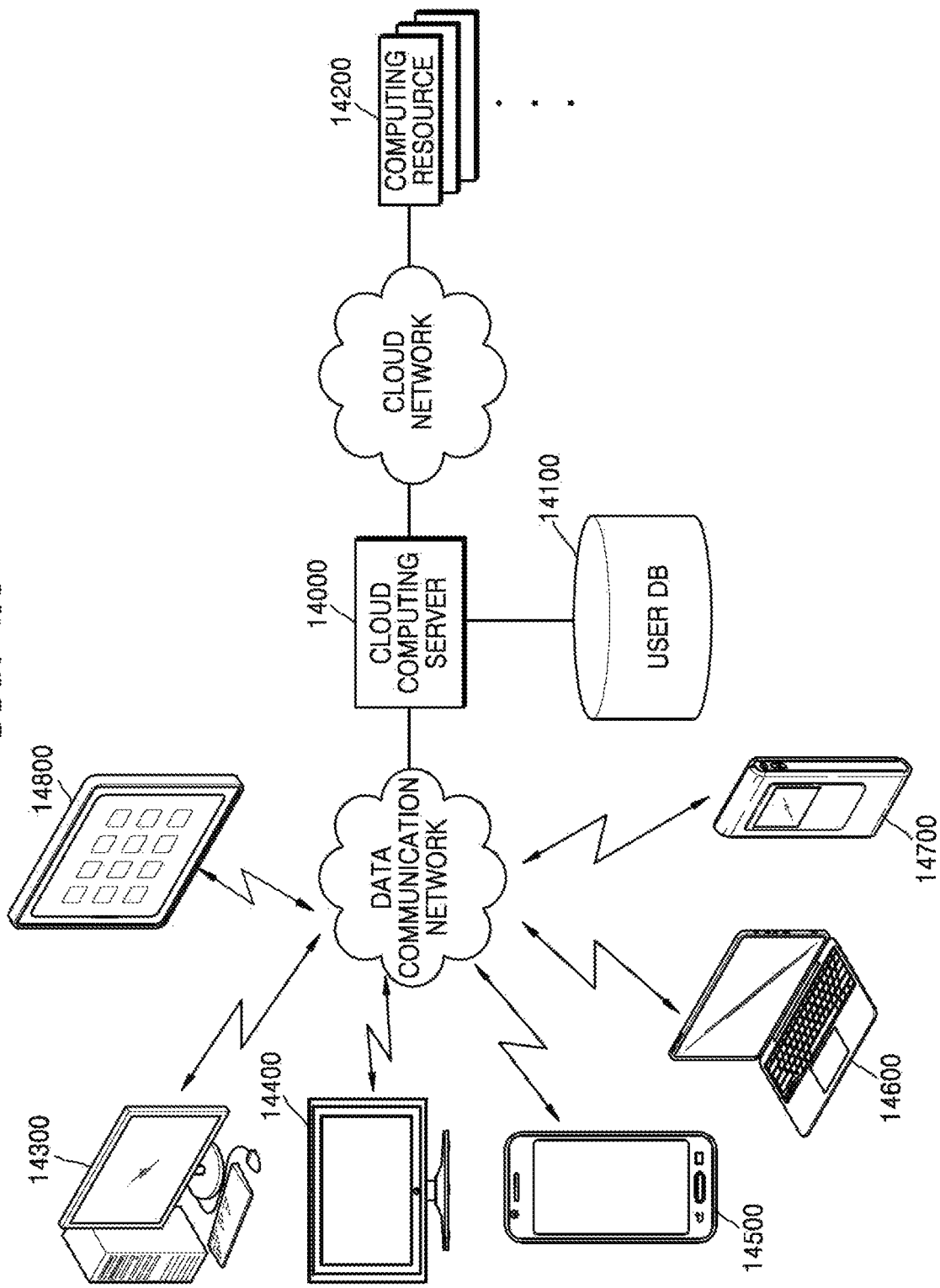
FIG. 29 illustrates a network structure of a cloud computing system using a video encoding apparatus and a video decoding apparatus, according to an embodiment.

FIG. 29 illustrates a network structure of a cloud computing system using the video encoding apparatus and the video decoding apparatus, according to various embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminal may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 26.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus of the present disclosure as described above with reference to FIGS. 1A through 22. As another example, the user terminal may include the video encoding apparatus of the present disclosure as described above with reference to FIGS. 1A through 22. Alternatively, the user terminal may include both the video decoding apparatus and the video encoding apparatus as described above with reference to FIGS. 1A through 20.

Various applications of a video encoding method, a video decoding method, a video encoding apparatus, and a video decoding apparatus according to various embodiments described above with reference to FIGS. 1A through 22 have been described above with reference to FIGS. 23 through 29. However, various embodiments of methods of storing the video encoding method and the video decoding method in a storage medium or various embodiments of methods of implementing the video encoding apparatus and the video decoding apparatus in a device described above with reference to FIGS. 1A through 22 are not limited to the embodiments of FIGS. 23 through 29.

While the present disclosure has been particularly shown and described with reference to embodiments thereof, it will be understood by one of ordinary skill in the art that various changes in form and details may be made therein without departing from the spirit and scope of the following claims. Therefore, the embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The invention claimed is:

1. A video decoding method comprising:
determining, based on a ratio of frequency components, a degree of change between neighboring samples of at least one integer pixel unit adjacent to a reference sample of an integer pixel unit of a current sample and the reference sample;
determining an interpolation filter among interpolation filters for producing reference samples of a sub-pixel unit to predict the current sample, based on the degree of change;
determining a predicted sample value of the current sample by using a reference sample of a sub-pixel unit produced by applying the determined interpolation filter to the reference sample and the neighboring samples; and
producing a reconstructed sample value of the current sample by using a residual value between the predicted sample value and a sample value of the current sample,
wherein the interpolation filters have different frequency passbands,
wherein the ratio of frequency components includes a ratio between low-frequency components and high-frequency components, and
wherein the determining of the degree of change comprises determining the degree of change based on the ratio between low-frequency components and high-frequency components among alternating-current (AC) components between the reference sample and neighboring samples of the integer pixel unit.

2. The video decoding method of claim 1, wherein the determining of the interpolation filter based on the degree of change comprises selecting an all-pass interpolation filter for passing all frequency bands when the degree of change is large, and selecting a low-pass interpolation filter for passing low-frequency bands when the degree of change is small.

3. The video decoding method of claim 1, wherein the determining of the interpolation filter based on the degree of change comprises selecting an all-pass interpolation filter for passing all frequency bands when the high-frequency components are large, and selecting a low-pass interpolation filter for passing low-frequency bands when the low-frequency components are small.

4. The video decoding method of claim 1, wherein the determining of the degree of change comprises performing discrete cosine transformation (DCT) on the reference sample and neighboring samples of the integer pixel unit, and determining the degree of change based on the ratio between low-frequency alternating-current (AC) components and high-frequency AC components among DCT coefficients,
wherein the DCT coefficients and DCT size are determined based on a number of taps of the interpolation filter.

5. The video decoding method of claim 1, wherein the interpolation filter is determined for each of at least one level among a reference block, a reference picture, a slice, and a sequence.

6. The video decoding method of claim 1, wherein the reference sample of the integer pixel unit is a sample at a position on a reference block indicated by integer components of a motion vector of a current block including the current sample, and
the reference sample of the sub-pixel unit is a sample at a position of a sub-pixel unit adjacent to the reference sample of the integer pixel unit, the position being indicated by a sub-pixel component of the motion vector of the current block.

7. A video encoding method comprising:
determining, based on a ratio of frequency components, a degree of change between neighboring samples of at least one integer pixel unit adjacent to a reference sample of an integer pixel unit of a current sample and the reference sample;
determining an interpolation filter among interpolation filters for producing reference samples of a sub-pixel unit to predict the current sample, based on the degree of change;
determining a predicted sample value of the current sample by using a reference sample of a sub-pixel unit produced by applying the determined interpolation filter to the reference sample and the neighboring samples; and
encoding a residual value between the predicted sample value and a sample value of the current sample,
wherein the interpolation filters have different frequency passbands,
wherein the ratio of frequency components includes a ratio between low-frequency components and high-frequency components, and
wherein the determining of the degree of change comprises determining the degree of change based on the ratio between low-frequency components and high-frequency components among alternating-current (AC) components between the reference sample and neighboring samples of the integer pixel unit.

8. The video encoding method of claim 7, wherein the determining of the interpolation filter based on the degree of change comprises selecting an all-pass interpolation filter for passing all frequency bands when the degree of change is large, and selecting a low-pass interpolation filter for passing low-frequency bands when the degree of change is small.

9. The video encoding method of claim 7, wherein the determining of the interpolation filter based on the degree of change comprises selecting an all-pass interpolation filter for passing all frequency bands when the high-frequency components are large, and selecting a low-pass interpolation filter for passing low-frequency bands when the low-frequency components are small.

10. The video encoding method of claim 7, wherein the determining of the degree of change comprises performing discrete cosine transformation (DCT) on the reference sample and neighboring samples of the integer pixel unit, and determining the degree of change based on the ratio between low-frequency alternating-current (AC) components and high-frequency AC components among DCT coefficients,
wherein the DCT coefficients and DCT size are determined based on a number of taps of the interpolation filter.

11. The video encoding method of claim 7, wherein the interpolation filter is determined for each of at least one level among a reference block, a reference picture, a slice, and a sequence.

12. A video decoding apparatus comprising at least one processor configured to:
   determine, based on a ratio of frequency components, a degree of change between neighboring samples of at least one integer pixel unit adjacent to a reference sample of an integer pixel unit of a current sample and the reference sample, and determine an interpolation filter among interpolation filters for producing reference samples of a sub-pixel unit to predict the current sample, based on the degree of change; and
   determine a predicted sample value of the current sample by using a reference sample of a sub-pixel unit produced by applying the determined interpolation filter to the reference sample and the neighboring samples, and produce a reconstructed sample value of the current sample by using a residual value between the predicted sample value and a sample value of the current sample,
   wherein the interpolation filters have different frequency passbands,
   wherein the ratio of frequency components includes a ratio between low-frequency components and high-frequency components, and
   wherein the determining of the degree of change comprises determining the degree of change based on the ratio between low-frequency components and high-frequency components among alternating-current (AC) components between the reference sample and neighboring samples of the integer pixel unit.

13. A non-transitory computer-readable recording medium having recorded thereon a program for performing the video decoding method of claim 1 in a computer.

* * * * *